United States Patent
Keidar

(10) Patent No.: US 12,440,648 B2
(45) Date of Patent: Oct. 14, 2025

(54) LOW-PROFILE STEERABLE CATHETER

(71) Applicant: Edwards Lifesciences Innovation (Israel) LTD., Caesarea (IL)

(72) Inventor: Yaron Keidar, Kiryat Ono (IL)

(73) Assignee: Edwards Lifesciences Innovation (Israel) Ltd., Caesarea (IL)

( * ) Notice: Subject to any disclaimer, the term of this patent is extended or adjusted under 35 U.S.C. 154(b) by 902 days.

(21) Appl. No.: 17/680,975

(22) Filed: Feb. 25, 2022

(65) Prior Publication Data
US 2022/0176076 A1   Jun. 9, 2022

Related U.S. Application Data

(63) Continuation of application No. PCT/IL2020/050926, filed on Aug. 25, 2020.

(60) Provisional application No. 62/893,093, filed on Aug. 28, 2019.

(51) Int. Cl.
| | |
|---|---|
| A61M 25/00 | (2006.01) |
| A61M 25/01 | (2006.01) |
| A61M 29/00 | (2006.01) |

(52) U.S. Cl.
CPC ........ *A61M 25/0147* (2013.01); *A61M 29/00* (2013.01); *A61M 2025/015* (2013.01)

(58) Field of Classification Search
CPC .......... A61M 25/0147; A61M 25/0023; A61M 2025/015; A61B 17/3439
See application file for complete search history.

(56) References Cited

U.S. PATENT DOCUMENTS

| | | |
|---|---|---|
| 3,604,488 A | 9/1971 | Wishart et al. |
| 3,656,185 A | 4/1972 | Carpentier |
| 3,840,018 A | 10/1974 | Heifetz |

(Continued)

FOREIGN PATENT DOCUMENTS

| | | |
|---|---|---|
| CN | 102727987 A | 10/2012 |
| CN | 108778387 A | 11/2018 |

(Continued)

OTHER PUBLICATIONS

Agarwal et al. International Cardiology Perspective Functional Tricuspid Regurgitation, Circ Cardiovasc Interv 2009;2;2;565-573 (2009).

(Continued)

*Primary Examiner* — Laura A Bouchelle
(74) *Attorney, Agent, or Firm* — Edwards Lifesciences

(57) ABSTRACT

A steerable catheter comprises a flexible tube having a proximal portion and a distal portion and comprising a circumferential wall that defines an elongate lumen between the proximal portion and the distal portion. A pull-wire can extend, in association with the wall, from the proximal portion to the distal portion. A pull-ring can be coupled to the wall at the distal portion such that the pull-ring circumscribes the lumen, and coupled to the pull-wire, such that pulling on the pull-wire bends the distal portion. The pull ring can have (i) a first state in which the pull-ring is elliptical and has a first eccentricity, and (ii) a second state in which the pull-ring is elliptical and has a second eccentricity that is smaller than the first eccentricity. The pull ring can be biased toward the first state, and deformable to the second state. Other embodiments are also described.

20 Claims, 8 Drawing Sheets

(56) References Cited

U.S. PATENT DOCUMENTS

| | | |
|---|---|---|
| 3,881,366 A | 5/1975 | Bradley et al. |
| 3,898,701 A | 8/1975 | La Russa |
| 4,042,979 A | 8/1977 | Angell |
| 4,118,805 A | 10/1978 | Reimels |
| 4,214,349 A | 7/1980 | Munch |
| 4,261,342 A | 4/1981 | Aranguren Duo |
| 4,290,151 A | 9/1981 | Massana |
| 4,434,828 A | 3/1984 | Trincia |
| 4,473,928 A | 10/1984 | Johnson |
| 4,602,911 A | 7/1986 | Ahmadi et al. |
| 4,625,727 A | 12/1986 | Leiboff |
| 4,712,549 A | 12/1987 | Peters et al. |
| 4,778,468 A | 10/1988 | Hunt et al. |
| 4,917,698 A | 4/1990 | Carpentier et al. |
| 4,935,027 A | 6/1990 | Yoon |
| 4,961,738 A | 10/1990 | Mackin |
| 5,042,707 A | 8/1991 | Taheri |
| 5,061,277 A | 10/1991 | Carpentier et al. |
| 5,064,431 A | 11/1991 | Gilbertson et al. |
| 5,104,407 A | 4/1992 | Lam et al. |
| 5,108,420 A | 4/1992 | Marks |
| 5,201,880 A | 4/1993 | Wright et al. |
| 5,258,008 A | 11/1993 | Wilk |
| 5,300,034 A | 4/1994 | Behnke et al. |
| 5,325,845 A | 7/1994 | Adair |
| 5,346,498 A | 9/1994 | Greelis et al. |
| 5,383,852 A | 1/1995 | Stevens-Wright |
| 5,449,368 A | 9/1995 | Kuzmak |
| 5,450,860 A | 9/1995 | O'Connor |
| 5,464,404 A | 11/1995 | Abela et al. |
| 5,474,518 A | 12/1995 | Farrer Velazquez |
| 5,477,856 A | 12/1995 | Lundquist |
| 5,593,424 A | 1/1997 | Northrup, III |
| 5,601,572 A | 2/1997 | Middleman et al. |
| 5,626,609 A | 5/1997 | Zvenyatsky et al. |
| 5,643,317 A | 7/1997 | Pavcnik et al. |
| 5,669,919 A | 9/1997 | Sanders et al. |
| 5,676,653 A | 10/1997 | Taylor et al. |
| 5,683,402 A | 11/1997 | Cosgrove et al. |
| 5,702,397 A | 12/1997 | Goble et al. |
| 5,702,398 A | 12/1997 | Tarabishy |
| 5,709,695 A | 1/1998 | Northrup, III |
| 5,716,370 A | 2/1998 | Williamson, IV et al. |
| 5,716,397 A | 2/1998 | Myers |
| 5,728,116 A | 3/1998 | Rosenman |
| 5,730,150 A | 3/1998 | Peppel et al. |
| 5,749,371 A | 5/1998 | Zadini et al. |
| 5,752,963 A | 5/1998 | Allard et al. |
| 5,782,844 A | 7/1998 | Yoon et al. |
| 5,810,882 A | 9/1998 | Bolduc et al. |
| 5,824,066 A | 10/1998 | Gross |
| 5,830,221 A | 11/1998 | Stein et al. |
| 5,843,120 A | 12/1998 | Israel et al. |
| 5,855,614 A | 1/1999 | Stevens et al. |
| 5,876,373 A | 3/1999 | Giba et al. |
| 5,935,098 A | 8/1999 | Blaisdell et al. |
| 5,957,953 A | 9/1999 | DiPoto et al. |
| 5,961,440 A | 10/1999 | Schweich, Jr. et al. |
| 5,961,539 A | 10/1999 | Northrup, III et al. |
| 5,984,959 A | 11/1999 | Robertson et al. |
| 5,993,459 A | 11/1999 | Larsen et al. |
| 6,042,554 A | 3/2000 | Rosenman et al. |
| 6,045,497 A | 4/2000 | Schweich, Jr. et al. |
| 6,050,936 A | 4/2000 | Schweich, Jr. et al. |
| 6,059,715 A | 5/2000 | Schweich, Jr. et al. |
| 6,074,341 A | 6/2000 | Anderson et al. |
| 6,074,401 A | 6/2000 | Gardiner et al. |
| 6,074,417 A | 6/2000 | Peredo |
| 6,086,582 A | 7/2000 | Altman et al. |
| 6,102,945 A | 8/2000 | Campbell |
| 6,106,550 A | 8/2000 | Magovern et al. |
| 6,110,200 A | 8/2000 | Hinnenkamp |
| 6,132,390 A | 10/2000 | Cookston et al. |
| 6,143,024 A | 11/2000 | Campbell et al. |
| 6,159,240 A | 12/2000 | Sparer et al. |
| 6,165,119 A | 12/2000 | Schweich, Jr. et al. |
| 6,174,332 B1 | 1/2001 | Loch et al. |
| 6,183,411 B1 | 2/2001 | Mortier et al. |
| 6,187,040 B1 | 2/2001 | Wright |
| 6,210,347 B1 | 4/2001 | Forsell |
| 6,217,610 B1 | 4/2001 | Carpentier et al. |
| 6,228,032 B1 | 5/2001 | Eaton et al. |
| 6,231,602 B1 | 5/2001 | Carpentier et al. |
| 6,251,092 B1 | 6/2001 | Qin et al. |
| 6,296,656 B1 | 10/2001 | Bolduc et al. |
| 6,315,784 B1 | 11/2001 | Djurovic |
| 6,319,281 B1 | 11/2001 | Patel |
| 6,328,746 B1 | 12/2001 | Gambale |
| 6,332,893 B1 | 12/2001 | Mortier et al. |
| 6,355,030 B1 | 3/2002 | Aldrich et al. |
| 6,361,559 B1 | 3/2002 | Houser et al. |
| 6,368,348 B1 | 4/2002 | Gabbay |
| 6,402,780 B2 | 6/2002 | Williamson, IV et al. |
| 6,406,420 B1 | 6/2002 | McCarthy et al. |
| 6,406,493 B1 | 6/2002 | Tu et al. |
| 6,419,696 B1 | 7/2002 | Ortiz et al. |
| 6,451,054 B1 | 9/2002 | Stevens |
| 6,458,076 B1 | 10/2002 | Pruitt |
| 6,461,336 B1 | 10/2002 | Larre |
| 6,461,366 B1 | 10/2002 | Seguin |
| 6,470,892 B1 | 10/2002 | Forsell |
| 6,503,274 B1 | 1/2003 | Howanec, Jr. et al. |
| 6,524,338 B1 | 2/2003 | Gundry |
| 6,527,780 B1 | 3/2003 | Wallace et al. |
| 6,530,952 B2 | 3/2003 | Vesely |
| 6,533,772 B1 | 3/2003 | Sherts et al. |
| 6,537,314 B2 | 3/2003 | Langberg et al. |
| 6,547,801 B1 | 4/2003 | Dargent et al. |
| 6,554,845 B1 | 4/2003 | Fleenor et al. |
| 6,564,805 B2 | 5/2003 | Garrison et al. |
| 6,565,603 B2 | 5/2003 | Cox |
| 6,569,198 B1 | 5/2003 | Wilson et al. |
| 6,579,297 B2 | 6/2003 | Bicek et al. |
| 6,589,160 B2 | 7/2003 | Schweich, Jr. et al. |
| 6,592,593 B1 | 7/2003 | Parodi et al. |
| 6,602,288 B1 | 8/2003 | Cosgrove et al. |
| 6,602,289 B1 | 8/2003 | Colvin et al. |
| 6,613,078 B1 | 9/2003 | Barone |
| 6,613,079 B1 | 9/2003 | Wolinsky et al. |
| 6,619,291 B2 | 9/2003 | Hlavka et al. |
| 6,626,899 B2 | 9/2003 | Houser et al. |
| 6,626,917 B1 | 9/2003 | Craig |
| 6,626,930 B1 | 9/2003 | Allen et al. |
| 6,629,534 B1 | 10/2003 | St. Goar et al. |
| 6,629,921 B1 | 10/2003 | Schweich, Jr. et al. |
| 6,651,671 B1 | 11/2003 | Donlon et al. |
| 6,652,556 B1 | 11/2003 | VanTassel et al. |
| 6,682,558 B2 | 1/2004 | Tu et al. |
| 6,689,125 B1 | 2/2004 | Keith et al. |
| 6,689,164 B1 | 2/2004 | Seguin |
| 6,695,866 B1 | 2/2004 | Kuehn et al. |
| 6,702,826 B2 | 3/2004 | Liddicoat et al. |
| 6,702,846 B2 | 3/2004 | Mikus et al. |
| 6,706,065 B2 | 3/2004 | Langberg et al. |
| 6,709,385 B2 | 3/2004 | Forsell |
| 6,709,456 B2 | 3/2004 | Langberg et al. |
| 6,711,444 B2 | 3/2004 | Koblish |
| 6,719,786 B2 | 4/2004 | Ryan et al. |
| 6,723,038 B1 | 4/2004 | Schroeder et al. |
| 6,726,716 B2 | 4/2004 | Marquez |
| 6,726,717 B2 | 4/2004 | Alfieri et al. |
| 6,749,630 B2 | 6/2004 | McCarthy et al. |
| 6,752,813 B2 | 6/2004 | Goldfarb et al. |
| 6,764,310 B1 | 7/2004 | Ichihashi et al. |
| 6,764,510 B2 | 7/2004 | Vidlund et al. |
| 6,764,810 B2 | 7/2004 | Ma et al. |
| 6,770,083 B2 | 8/2004 | Seguin |
| 6,786,924 B2 | 9/2004 | Ryan et al. |
| 6,786,925 B1 | 9/2004 | Schoon et al. |
| 6,790,231 B2 | 9/2004 | Liddicoat et al. |
| 6,797,001 B2 | 9/2004 | Mathis et al. |
| 6,797,002 B2 | 9/2004 | Spence et al. |
| 6,802,319 B2 | 10/2004 | Stevens et al. |
| 6,805,710 B2 | 10/2004 | Bolling et al. |

(56) References Cited

U.S. PATENT DOCUMENTS

| | | |
|---|---|---|
| 6,805,711 B2 | 10/2004 | Quijano et al. |
| 6,855,126 B2 | 2/2005 | Flinchbaugh |
| 6,858,039 B2 | 2/2005 | McCarthy |
| 6,884,250 B2 | 4/2005 | Monassevitch et al. |
| 6,893,459 B1 | 5/2005 | Macoviak |
| 6,908,478 B2 | 6/2005 | Alferness et al. |
| 6,908,482 B2 | 6/2005 | McCarthy et al. |
| 6,918,917 B1 | 7/2005 | Nguyen et al. |
| 6,926,730 B1 | 8/2005 | Nguyen et al. |
| 6,960,217 B2 | 11/2005 | Bolduc |
| 6,976,995 B2 | 12/2005 | Mathis et al. |
| 6,986,775 B2 | 1/2006 | Morales et al. |
| 6,989,028 B2 | 1/2006 | Lashinski et al. |
| 6,997,951 B2 | 2/2006 | Solem et al. |
| 7,004,176 B2 | 2/2006 | Lau |
| 7,007,798 B2 | 3/2006 | Happonen et al. |
| 7,011,669 B2 | 3/2006 | Kimblad |
| 7,011,682 B2 | 3/2006 | Lashinski et al. |
| 7,018,406 B2 | 3/2006 | Seguin et al. |
| 7,037,334 B1 | 5/2006 | Hlavka et al. |
| 7,077,850 B2 | 7/2006 | Kortenbach |
| 7,077,862 B2 | 7/2006 | Vidlund et al. |
| 7,087,064 B1 | 8/2006 | Hyde |
| 7,101,395 B2 | 9/2006 | Tremulis et al. |
| 7,101,396 B2 | 9/2006 | Artof et al. |
| 7,112,207 B2 | 9/2006 | Allen et al. |
| 7,118,595 B2 | 10/2006 | Ryan et al. |
| 7,125,421 B2 | 10/2006 | Tremulis et al. |
| 7,150,737 B2 | 12/2006 | Purdy et al. |
| 7,159,593 B2 | 1/2007 | McCarthy et al. |
| 7,166,127 B2 | 1/2007 | Spence et al. |
| 7,169,187 B2 | 1/2007 | Datta et al. |
| 7,172,625 B2 | 2/2007 | Shu et al. |
| 7,175,660 B2 | 2/2007 | Cartledge et al. |
| 7,186,262 B2 | 3/2007 | Saadat |
| 7,186,264 B2 | 3/2007 | Liddicoat et al. |
| 7,189,199 B2 | 3/2007 | McCarthy et al. |
| 7,192,443 B2 | 3/2007 | Solem et al. |
| 7,220,277 B2 | 5/2007 | Arru et al. |
| 7,226,467 B2 | 6/2007 | Lucatero et al. |
| 7,226,477 B2 | 6/2007 | Cox |
| 7,226,647 B2 | 6/2007 | Kasperchik et al. |
| 7,229,452 B2 | 6/2007 | Kayan |
| 7,238,191 B2 | 7/2007 | Bachmann |
| 7,288,097 B2 | 10/2007 | Seguin |
| 7,294,148 B2 | 11/2007 | McCarthy |
| 7,311,728 B2 | 12/2007 | Solem et al. |
| 7,311,729 B2 | 12/2007 | Mathis et al. |
| 7,314,485 B2 | 1/2008 | Mathis |
| 7,316,710 B1 | 1/2008 | Cheng et al. |
| 7,329,279 B2 | 2/2008 | Haug et al. |
| 7,329,280 B2 | 2/2008 | Bolling et al. |
| 7,335,213 B1 | 2/2008 | Hyde et al. |
| 7,361,190 B2 | 4/2008 | Shaoulian et al. |
| 7,364,588 B2 | 4/2008 | Mathis et al. |
| 7,377,941 B2 | 5/2008 | Rhee et al. |
| 7,390,329 B2 | 6/2008 | Westra et al. |
| 7,404,824 B1 | 7/2008 | Webler et al. |
| 7,431,692 B2 | 10/2008 | Zollinger et al. |
| 7,442,207 B2 | 10/2008 | Rafiee |
| 7,452,376 B2 | 11/2008 | Lim et al. |
| 7,455,690 B2 | 11/2008 | Cartledge et al. |
| 7,485,142 B2 | 2/2009 | Milo |
| 7,485,143 B2 | 2/2009 | Webler et al. |
| 7,500,989 B2 | 3/2009 | Solem et al. |
| 7,507,252 B2 | 3/2009 | Lashinski et al. |
| 7,510,575 B2 | 3/2009 | Spenser et al. |
| 7,510,577 B2 | 3/2009 | Moaddeb et al. |
| 7,527,647 B2 | 5/2009 | Spence |
| 7,530,995 B2 | 5/2009 | Quijano et al. |
| 7,549,983 B2 | 6/2009 | Roue et al. |
| 7,559,936 B2 | 7/2009 | Levine |
| 7,562,660 B2 | 7/2009 | Saadat |
| 7,563,267 B2 | 7/2009 | Goldfarb et al. |
| 7,563,273 B2 | 7/2009 | Goldfarb et al. |
| 7,569,062 B1 | 8/2009 | Kuehn et al. |
| 7,585,321 B2 | 9/2009 | Cribier |
| 7,588,582 B2 | 9/2009 | Starksen et al. |
| 7,591,826 B2 | 9/2009 | Alferness et al. |
| 7,604,646 B2 | 10/2009 | Goldfarb et al. |
| 7,608,091 B2 | 10/2009 | Goldfarb et al. |
| 7,608,103 B2 | 10/2009 | McCarthy |
| 7,618,449 B2 | 11/2009 | Tremulis et al. |
| 7,625,403 B2 | 12/2009 | Krivoruchko |
| 7,632,303 B1 | 12/2009 | Stalker et al. |
| 7,635,329 B2 | 12/2009 | Goldfarb et al. |
| 7,635,386 B1 | 12/2009 | Gammie |
| 7,655,015 B2 | 2/2010 | Goldfarb et al. |
| 7,666,204 B2 | 2/2010 | Thornton et al. |
| 7,682,319 B2 | 3/2010 | Martin et al. |
| 7,682,369 B2 | 3/2010 | Seguin |
| 7,686,822 B2 | 3/2010 | Shayani |
| 7,699,892 B2 | 4/2010 | Rafiee et al. |
| 7,704,269 B2 | 4/2010 | St. Goar et al. |
| 7,704,277 B2 | 4/2010 | Zakay et al. |
| 7,722,666 B2 | 5/2010 | Lafontaine |
| 7,736,388 B2 | 6/2010 | Goldfarb et al. |
| 7,748,389 B2 | 7/2010 | Salahieh et al. |
| 7,753,924 B2 | 7/2010 | Starksen et al. |
| 7,758,632 B2 | 7/2010 | Hojeibane et al. |
| 7,780,726 B2 | 8/2010 | Seguin |
| 7,871,368 B2 | 1/2011 | Zollinger et al. |
| 7,871,433 B2 | 1/2011 | Lattouf |
| 7,883,475 B2 | 2/2011 | Dupont et al. |
| 7,883,538 B2 | 2/2011 | To et al. |
| 7,892,281 B2 | 2/2011 | Seguin et al. |
| 7,927,370 B2 | 4/2011 | Webler et al. |
| 7,927,371 B2 | 4/2011 | Navia et al. |
| 7,942,927 B2 | 5/2011 | Kaye et al. |
| 7,947,056 B2 | 5/2011 | Griego et al. |
| 7,955,315 B2 | 6/2011 | Feinberg et al. |
| 7,955,377 B2 | 6/2011 | Melsheimer |
| 7,981,152 B1 | 7/2011 | Webler et al. |
| 7,992,567 B2 | 8/2011 | Hirotsuka et al. |
| 7,993,368 B2 | 8/2011 | Gambale et al. |
| 7,993,397 B2 | 8/2011 | Lashinski et al. |
| 8,012,201 B2 | 9/2011 | Lashinski et al. |
| 8,034,103 B2 | 10/2011 | Burriesci et al. |
| 8,052,592 B2 | 11/2011 | Goldfarb et al. |
| 8,057,493 B2 | 11/2011 | Goldfarb et al. |
| 8,062,355 B2 | 11/2011 | Figulla et al. |
| 8,070,804 B2 | 12/2011 | Hyde et al. |
| 8,070,805 B2 | 12/2011 | Vidlund et al. |
| 8,075,616 B2 | 12/2011 | Solem et al. |
| 8,100,964 B2 | 1/2012 | Spence |
| 8,123,801 B2 | 2/2012 | Milo |
| 8,142,493 B2 | 3/2012 | Spence et al. |
| 8,142,495 B2 | 3/2012 | Hasenkam et al. |
| 8,142,496 B2 | 3/2012 | Berreklouw |
| 8,147,542 B2 | 4/2012 | Maisano et al. |
| 8,152,844 B2 | 4/2012 | Rao et al. |
| 8,163,013 B2 | 4/2012 | Machold et al. |
| 8,187,299 B2 | 5/2012 | Goldfarb et al. |
| 8,187,324 B2 | 5/2012 | Webler et al. |
| 8,202,315 B2 | 6/2012 | Hlavka et al. |
| 8,206,439 B2 | 6/2012 | Gomez Duran |
| 8,216,302 B2 | 7/2012 | Wilson et al. |
| 8,231,671 B2 | 7/2012 | Kim |
| 8,262,725 B2 | 9/2012 | Subramanian |
| 8,265,758 B2 | 9/2012 | Policker et al. |
| 8,277,502 B2 | 10/2012 | Miller et al. |
| 8,287,584 B2 | 10/2012 | Salahieh et al. |
| 8,287,591 B2 | 10/2012 | Keidar et al. |
| 8,292,884 B2 | 10/2012 | Levine et al. |
| 8,303,608 B2 | 11/2012 | Goldfarb et al. |
| 8,323,334 B2 | 12/2012 | Deem et al. |
| 8,328,868 B2 | 12/2012 | Paul et al. |
| 8,333,777 B2 | 12/2012 | Schaller et al. |
| 8,343,173 B2 | 1/2013 | Starksen et al. |
| 8,343,174 B2 | 1/2013 | Goldfarb et al. |
| 8,343,213 B2 | 1/2013 | Salahieh et al. |
| 8,349,002 B2 | 1/2013 | Milo |
| 8,353,956 B2 | 1/2013 | Miller et al. |
| 8,357,195 B2 | 1/2013 | Kuehn |

(56) References Cited

U.S. PATENT DOCUMENTS

| | | |
|---|---|---|
| 8,382,829 B1 | 2/2013 | Call et al. |
| 8,388,680 B2 | 3/2013 | Starksen et al. |
| 8,393,517 B2 | 3/2013 | Milo |
| 8,419,825 B2 | 4/2013 | Burgler et al. |
| 8,430,926 B2 | 4/2013 | Kirson |
| 8,449,573 B2 | 5/2013 | Chu |
| 8,449,599 B2 | 5/2013 | Chau et al. |
| 8,454,686 B2 | 6/2013 | Alkhatib |
| 8,460,370 B2 | 6/2013 | Zakay |
| 8,460,371 B2 | 6/2013 | Hlavka et al. |
| 8,475,491 B2 | 7/2013 | Milo |
| 8,475,525 B2 | 7/2013 | Maisano et al. |
| 8,480,732 B2 | 7/2013 | Subramanian |
| 8,518,107 B2 | 8/2013 | Tsukashima et al. |
| 8,523,940 B2 | 9/2013 | Richardson et al. |
| 8,551,161 B2 | 10/2013 | Dolan |
| 8,585,755 B2 | 11/2013 | Chau et al. |
| 8,591,576 B2 | 11/2013 | Hasenkam et al. |
| 8,608,797 B2 | 12/2013 | Gross et al. |
| 8,628,569 B2 | 1/2014 | Benichou et al. |
| 8,628,571 B1 | 1/2014 | Hacohen et al. |
| 8,641,727 B2 | 2/2014 | Starksen et al. |
| 8,652,202 B2 | 2/2014 | Alon et al. |
| 8,652,203 B2 | 2/2014 | Quadri et al. |
| 8,679,174 B2 | 3/2014 | Ottma et al. |
| 8,685,086 B2 | 4/2014 | Navia et al. |
| 8,728,097 B1 | 5/2014 | Sugimoto et al. |
| 8,728,155 B2 | 5/2014 | Montorfano et al. |
| 8,734,467 B2 | 5/2014 | Miller et al. |
| 8,734,699 B2 | 5/2014 | Heideman et al. |
| 8,740,920 B2 | 6/2014 | Goldfarb et al. |
| 8,747,463 B2 | 6/2014 | Fogarty et al. |
| 8,778,021 B2 | 7/2014 | Cartledge |
| 8,784,481 B2 | 7/2014 | Alkhatib et al. |
| 8,790,367 B2 | 7/2014 | Nguyen et al. |
| 8,790,394 B2 | 7/2014 | Miller et al. |
| 8,795,298 B2 | 8/2014 | Hernlund et al. |
| 8,795,355 B2 | 8/2014 | Alkhatib |
| 8,795,356 B2 | 8/2014 | Quadri et al. |
| 8,795,357 B2 | 8/2014 | Yohanan et al. |
| 8,808,366 B2 | 8/2014 | Braido et al. |
| 8,808,368 B2 | 8/2014 | Maisano et al. |
| 8,845,717 B2 | 9/2014 | Khairkhahan et al. |
| 8,845,723 B2 | 9/2014 | Spence et al. |
| 8,852,261 B2 | 10/2014 | White |
| 8,852,272 B2 | 10/2014 | Gross et al. |
| 8,858,623 B2 | 10/2014 | Miller et al. |
| 8,864,822 B2 | 10/2014 | Spence et al. |
| 8,870,948 B1 | 10/2014 | Erzberger et al. |
| 8,870,949 B2 | 10/2014 | Rowe |
| 8,888,843 B2 | 11/2014 | Khairkhahan et al. |
| 8,889,861 B2 | 11/2014 | Skead et al. |
| 8,894,702 B2 | 11/2014 | Quadri et al. |
| 8,911,461 B2 | 12/2014 | Traynor et al. |
| 8,911,494 B2 | 12/2014 | Hammer et al. |
| 8,926,696 B2 | 1/2015 | Cabiri et al. |
| 8,926,697 B2 | 1/2015 | Gross et al. |
| 8,932,343 B2 | 1/2015 | Alkhatib et al. |
| 8,932,348 B2 | 1/2015 | Solem et al. |
| 8,940,044 B2 | 1/2015 | Hammer et al. |
| 8,945,211 B2 | 2/2015 | Sugimoto |
| 8,951,285 B2 | 2/2015 | Sugimoto et al. |
| 8,951,286 B2 | 2/2015 | Sugimoto et al. |
| 8,961,595 B2 | 2/2015 | Alkhatib |
| 8,961,602 B2 | 2/2015 | Kovach et al. |
| 8,979,922 B2 | 3/2015 | Jayasinghe et al. |
| 8,992,604 B2 | 3/2015 | Gross et al. |
| 9,005,273 B2 | 4/2015 | Salahieh et al. |
| 9,011,520 B2 | 4/2015 | Miller et al. |
| 9,011,530 B2 | 4/2015 | Reich et al. |
| 9,023,100 B2 | 5/2015 | Quadri et al. |
| 9,072,603 B2 | 7/2015 | Tuval et al. |
| 9,107,749 B2 | 8/2015 | Bobo et al. |
| 9,119,719 B2 | 9/2015 | Zipory et al. |
| 9,125,632 B2 | 9/2015 | Loulmet et al. |
| 9,125,742 B2 | 9/2015 | Yoganathan et al. |
| 9,138,316 B2 | 9/2015 | Bielefeld |
| 9,173,646 B2 | 11/2015 | Fabro |
| 9,180,005 B1 | 11/2015 | Lashinski et al. |
| 9,180,007 B2 | 11/2015 | Reich et al. |
| 9,192,472 B2 | 11/2015 | Gross et al. |
| 9,198,756 B2 | 12/2015 | Aklog et al. |
| 9,226,825 B2 | 1/2016 | Starksen et al. |
| 9,265,608 B2 | 2/2016 | Miller et al. |
| 9,326,857 B2 | 5/2016 | Cartledge et al. |
| 9,414,921 B2 | 8/2016 | Miller et al. |
| 9,427,316 B2 | 8/2016 | Schweich, Jr. et al. |
| 9,474,606 B2 | 10/2016 | Zipory et al. |
| 9,526,613 B2 | 12/2016 | Gross et al. |
| 9,561,104 B2 | 2/2017 | Miller et al. |
| 9,579,090 B1 | 2/2017 | Simms et al. |
| 9,693,865 B2 | 7/2017 | Gilmore et al. |
| 9,730,793 B2 | 8/2017 | Reich et al. |
| 9,788,941 B2 | 10/2017 | Hacohen |
| 9,801,720 B2 | 10/2017 | Gilmore et al. |
| 9,907,547 B2 | 3/2018 | Gilmore et al. |
| 10,368,852 B2 | 8/2019 | Gerhardt et al. |
| 2001/0021874 A1 | 9/2001 | Carpentier et al. |
| 2002/0022862 A1 | 2/2002 | Grafton et al. |
| 2002/0082525 A1 | 6/2002 | Oslund et al. |
| 2002/0087048 A1 | 7/2002 | Brock et al. |
| 2002/0103532 A1 | 8/2002 | Langberg et al. |
| 2002/0120292 A1 | 8/2002 | Morgan |
| 2002/0151916 A1 | 10/2002 | Muramatsu et al. |
| 2002/0151970 A1 | 10/2002 | Garrison et al. |
| 2002/0169358 A1 | 11/2002 | Mortier et al. |
| 2002/0177904 A1 | 11/2002 | Huxel et al. |
| 2002/0188301 A1 | 12/2002 | Dallara et al. |
| 2002/0188350 A1 | 12/2002 | Arru et al. |
| 2002/0198586 A1 | 12/2002 | Inoue |
| 2003/0050693 A1 | 3/2003 | Quijano et al. |
| 2003/0078465 A1 | 4/2003 | Pai et al. |
| 2003/0078653 A1 | 4/2003 | Vesely et al. |
| 2003/0083538 A1 | 5/2003 | Adams et al. |
| 2003/0093148 A1 | 5/2003 | Bolling et al. |
| 2003/0105519 A1 | 6/2003 | Fasol et al. |
| 2003/0114901 A1 | 6/2003 | Loeb et al. |
| 2003/0120340 A1 | 6/2003 | Liska et al. |
| 2003/0144657 A1 | 7/2003 | Bowe et al. |
| 2003/0167062 A1 | 9/2003 | Gambale et al. |
| 2003/0171760 A1 | 9/2003 | Gambale |
| 2003/0199974 A1 | 10/2003 | Lee et al. |
| 2003/0204193 A1 | 10/2003 | Gabriel et al. |
| 2003/0204195 A1 | 10/2003 | Keane et al. |
| 2003/0229350 A1 | 12/2003 | Kay |
| 2003/0229395 A1 | 12/2003 | Cox |
| 2004/0002735 A1 | 1/2004 | Lizardi et al. |
| 2004/0010287 A1 | 1/2004 | Bonutti |
| 2004/0019359 A1 | 1/2004 | Worley et al. |
| 2004/0019377 A1 | 1/2004 | Taylor et al. |
| 2004/0024451 A1 | 2/2004 | Johnson et al. |
| 2004/0039442 A1 | 2/2004 | St. Goar et al. |
| 2004/0044350 A1 | 3/2004 | Martin et al. |
| 2004/0049211 A1 | 3/2004 | Tremulis et al. |
| 2004/0059413 A1 | 3/2004 | Argento |
| 2004/0068273 A1 | 4/2004 | Fariss et al. |
| 2004/0106950 A1 | 6/2004 | Grafton et al. |
| 2004/0111095 A1 | 6/2004 | Gordon et al. |
| 2004/0116848 A1 | 6/2004 | Gardeski et al. |
| 2004/0122514 A1 | 6/2004 | Fogarty et al. |
| 2004/0127982 A1 | 7/2004 | Machold et al. |
| 2004/0133274 A1 | 7/2004 | Webler et al. |
| 2004/0133374 A1 | 7/2004 | Kattan |
| 2004/0138744 A1 | 7/2004 | Lashinski et al. |
| 2004/0138745 A1 | 7/2004 | Macoviak et al. |
| 2004/0148019 A1 | 7/2004 | Vidlund et al. |
| 2004/0148020 A1 | 7/2004 | Vidlund et al. |
| 2004/0148021 A1 | 7/2004 | Cartledge et al. |
| 2004/0176788 A1 | 9/2004 | Opolski |
| 2004/0181287 A1 | 9/2004 | Gellman |
| 2004/0186566 A1 | 9/2004 | Hindrichs et al. |
| 2004/0193191 A1 | 9/2004 | Starksen et al. |
| 2004/0243227 A1 | 12/2004 | Starksen et al. |
| 2004/0260317 A1 | 12/2004 | Bloom et al. |

(56) References Cited

U.S. PATENT DOCUMENTS

| | | |
|---|---|---|
| 2004/0260344 A1 | 12/2004 | Lyons et al. |
| 2004/0260393 A1 | 12/2004 | Rahdert et al. |
| 2004/0260394 A1 | 12/2004 | Douk et al. |
| 2004/0267358 A1 | 12/2004 | Reitan |
| 2005/0004668 A1 | 1/2005 | Aklog et al. |
| 2005/0010287 A1 | 1/2005 | Macoviak et al. |
| 2005/0010787 A1 | 1/2005 | Tarbouriech |
| 2005/0016560 A1 | 1/2005 | Voughlohn |
| 2005/0049692 A1 | 3/2005 | Numamoto et al. |
| 2005/0055038 A1 | 3/2005 | Kelleher et al. |
| 2005/0055087 A1 | 3/2005 | Starksen |
| 2005/0060030 A1 | 3/2005 | Lashinski et al. |
| 2005/0065601 A1 | 3/2005 | Lee et al. |
| 2005/0070999 A1 | 3/2005 | Spence |
| 2005/0075654 A1 | 4/2005 | Kelleher |
| 2005/0075727 A1 | 4/2005 | Wheatley |
| 2005/0090827 A1 | 4/2005 | Gedebou |
| 2005/0090834 A1 | 4/2005 | Chiang et al. |
| 2005/0096740 A1 | 5/2005 | Langberg et al. |
| 2005/0107871 A1 | 5/2005 | Realyvasquez et al. |
| 2005/0119734 A1 | 6/2005 | Spence et al. |
| 2005/0125002 A1 | 6/2005 | Baran et al. |
| 2005/0125011 A1 | 6/2005 | Spence et al. |
| 2005/0131533 A1 | 6/2005 | Alfieri et al. |
| 2005/0137686 A1 | 6/2005 | Salahieh et al. |
| 2005/0137688 A1 | 6/2005 | Salahieh et al. |
| 2005/0137695 A1 | 6/2005 | Salahieh et al. |
| 2005/0159728 A1 | 7/2005 | Armour et al. |
| 2005/0159810 A1 | 7/2005 | Filsoufi |
| 2005/0171601 A1 | 8/2005 | Cosgrove et al. |
| 2005/0177180 A1 | 8/2005 | Kaganov et al. |
| 2005/0177228 A1 | 8/2005 | Solem et al. |
| 2005/0187568 A1 | 8/2005 | Klenk et al. |
| 2005/0192596 A1 | 9/2005 | Jugenheimer et al. |
| 2005/0203549 A1 | 9/2005 | Realyvasquez |
| 2005/0203606 A1 | 9/2005 | VanCamp |
| 2005/0216039 A1 | 9/2005 | Lederman |
| 2005/0216079 A1 | 9/2005 | MaCoviak |
| 2005/0222665 A1 | 10/2005 | Aranyi |
| 2005/0234481 A1 | 10/2005 | Waller |
| 2005/0240199 A1 | 10/2005 | Martinek et al. |
| 2005/0251177 A1 | 11/2005 | Saadat et al. |
| 2005/0256532 A1 | 11/2005 | Nayak et al. |
| 2005/0267478 A1 | 12/2005 | Corradi et al. |
| 2005/0273138 A1 | 12/2005 | To et al. |
| 2005/0288778 A1 | 12/2005 | Shaoulian et al. |
| 2006/0004442 A1 | 1/2006 | Spenser et al. |
| 2006/0004443 A1 | 1/2006 | Liddicoat et al. |
| 2006/0020326 A9 | 1/2006 | Bolduc et al. |
| 2006/0020327 A1 | 1/2006 | Lashinski et al. |
| 2006/0020333 A1 | 1/2006 | Lashinski et al. |
| 2006/0020336 A1 | 1/2006 | Liddicoat |
| 2006/0025787 A1 | 2/2006 | Morales et al. |
| 2006/0025858 A1 | 2/2006 | Alameddine |
| 2006/0030885 A1 | 2/2006 | Hyde |
| 2006/0041319 A1 | 2/2006 | Taylor et al. |
| 2006/0069429 A1 | 3/2006 | Spence et al. |
| 2006/0074486 A1 | 4/2006 | Liddicoat et al. |
| 2006/0085012 A1 | 4/2006 | Dolan |
| 2006/0095009 A1 | 5/2006 | Lampropoulos et al. |
| 2006/0106423 A1 | 5/2006 | Weisel et al. |
| 2006/0116757 A1 | 6/2006 | Lashinski et al. |
| 2006/0122633 A1 | 6/2006 | To et al. |
| 2006/0129166 A1 | 6/2006 | Lavelle |
| 2006/0142694 A1 | 6/2006 | Bednarek et al. |
| 2006/0149280 A1 | 7/2006 | Harvie et al. |
| 2006/0149368 A1 | 7/2006 | Spence |
| 2006/0161265 A1 | 7/2006 | Levine et al. |
| 2006/0173251 A1 | 8/2006 | Govari et al. |
| 2006/0184240 A1 | 8/2006 | Jimenez et al. |
| 2006/0184242 A1 | 8/2006 | Lichtenstein |
| 2006/0195134 A1 | 8/2006 | Crittenden |
| 2006/0206203 A1 | 9/2006 | Yang et al. |
| 2006/0212048 A1 | 9/2006 | Crainich |
| 2006/0241622 A1 | 10/2006 | Zergiebel |
| 2006/0241656 A1 | 10/2006 | Starksen et al. |
| 2006/0241748 A1 | 10/2006 | Lee et al. |
| 2006/0247763 A1 | 11/2006 | Slater |
| 2006/0259135 A1 | 11/2006 | Navia et al. |
| 2006/0271175 A1 | 11/2006 | Woolfson et al. |
| 2006/0276871 A1 | 12/2006 | Lamson et al. |
| 2006/0282161 A1 | 12/2006 | Huynh et al. |
| 2006/0287661 A1 | 12/2006 | Bolduc et al. |
| 2006/0287716 A1 | 12/2006 | Banbury et al. |
| 2007/0001627 A1 | 1/2007 | Lin et al. |
| 2007/0010800 A1 | 1/2007 | Weitzner et al. |
| 2007/0016287 A1 | 1/2007 | Cartledge et al. |
| 2007/0016288 A1 | 1/2007 | Gurskis et al. |
| 2007/0021781 A1 | 1/2007 | Jervis et al. |
| 2007/0027533 A1 | 2/2007 | Douk |
| 2007/0027536 A1 | 2/2007 | Mihaljevic et al. |
| 2007/0032823 A1 | 2/2007 | Tegg |
| 2007/0038221 A1 | 2/2007 | Fine et al. |
| 2007/0038293 A1 | 2/2007 | St.Goar et al. |
| 2007/0038296 A1 | 2/2007 | Navia et al. |
| 2007/0039425 A1 | 2/2007 | Wang |
| 2007/0049942 A1 | 3/2007 | Hindrichs et al. |
| 2007/0049970 A1 | 3/2007 | Belef et al. |
| 2007/0051377 A1 | 3/2007 | Douk et al. |
| 2007/0055206 A1 | 3/2007 | To et al. |
| 2007/0060922 A1 | 3/2007 | Dreyfuss |
| 2007/0061010 A1 | 3/2007 | Hauser et al. |
| 2007/0066863 A1 | 3/2007 | Rafiee et al. |
| 2007/0078297 A1 | 4/2007 | Rafiee et al. |
| 2007/0080188 A1 | 4/2007 | Spence et al. |
| 2007/0083168 A1 | 4/2007 | Whiting et al. |
| 2007/0083235 A1 | 4/2007 | Jervis et al. |
| 2007/0100427 A1 | 5/2007 | Perouse |
| 2007/0106328 A1 | 5/2007 | Wardle et al. |
| 2007/0112359 A1 | 5/2007 | Kimura et al. |
| 2007/0112422 A1 | 5/2007 | Dehdashtian |
| 2007/0112425 A1 | 5/2007 | Schaller et al. |
| 2007/0118151 A1 | 5/2007 | Davidson |
| 2007/0118154 A1 | 5/2007 | Crabtree |
| 2007/0118213 A1 | 5/2007 | Loulmet |
| 2007/0118215 A1 | 5/2007 | Moaddeb |
| 2007/0142907 A1 | 6/2007 | Moaddeb et al. |
| 2007/0162111 A1 | 7/2007 | Fukamachi et al. |
| 2007/0173931 A1 | 7/2007 | Tremulis et al. |
| 2007/0198082 A1 | 8/2007 | Kapadia et al. |
| 2007/0219558 A1 | 9/2007 | Deutsch |
| 2007/0239208 A1 | 10/2007 | Crawford |
| 2007/0244554 A1 | 10/2007 | Rafiee et al. |
| 2007/0244556 A1 | 10/2007 | Rafiee et al. |
| 2007/0255397 A1 | 11/2007 | Ryan et al. |
| 2007/0255400 A1 | 11/2007 | Parravicini et al. |
| 2007/0270755 A1 | 11/2007 | Von Oepen et al. |
| 2007/0276437 A1 | 11/2007 | Call et al. |
| 2007/0282375 A1 | 12/2007 | Hindrichs et al. |
| 2007/0282429 A1 | 12/2007 | Hauser et al. |
| 2007/0295172 A1 | 12/2007 | Swartz |
| 2007/0299424 A1 | 12/2007 | Cumming et al. |
| 2008/0004697 A1 | 1/2008 | Lichtenstein et al. |
| 2008/0027483 A1 | 1/2008 | Cartledge et al. |
| 2008/0027555 A1 | 1/2008 | Hawkins |
| 2008/0033460 A1 | 2/2008 | Ziniti et al. |
| 2008/0035160 A1 | 2/2008 | Woodson et al. |
| 2008/0039935 A1 | 2/2008 | Buch et al. |
| 2008/0051703 A1 | 2/2008 | Thornton et al. |
| 2008/0058595 A1 | 3/2008 | Snoke et al. |
| 2008/0065011 A1 | 3/2008 | Marchand et al. |
| 2008/0065204 A1 | 3/2008 | Macoviak et al. |
| 2008/0071366 A1 | 3/2008 | Tuval et al. |
| 2008/0086138 A1 | 4/2008 | Stone et al. |
| 2008/0086203 A1 | 4/2008 | Roberts |
| 2008/0091169 A1 | 4/2008 | Heideman et al. |
| 2008/0091257 A1 | 4/2008 | Andreas et al. |
| 2008/0097483 A1 | 4/2008 | Ortiz et al. |
| 2008/0097523 A1 | 4/2008 | Bolduc et al. |
| 2008/0103572 A1 | 5/2008 | Gerber |
| 2008/0140116 A1 | 6/2008 | Bonutti |
| 2008/0167713 A1 | 7/2008 | Bolling |
| 2008/0167714 A1 | 7/2008 | St. Goar et al. |
| 2008/0177380 A1 | 7/2008 | Starksen et al. |

(56) References Cited

U.S. PATENT DOCUMENTS

| | | |
|---|---|---|
| 2008/0195126 A1 | 8/2008 | Solem |
| 2008/0195200 A1 | 8/2008 | Vidlund et al. |
| 2008/0208265 A1 | 8/2008 | Frazier et al. |
| 2008/0221672 A1 | 9/2008 | Lamphere et al. |
| 2008/0228030 A1 | 9/2008 | Godin |
| 2008/0228223 A1 | 9/2008 | Alkhatib |
| 2008/0234729 A1 | 9/2008 | Page et al. |
| 2008/0262480 A1 | 10/2008 | Stahler et al. |
| 2008/0262609 A1 | 10/2008 | Gross et al. |
| 2008/0275300 A1 | 11/2008 | Rothe et al. |
| 2008/0275469 A1 | 11/2008 | Fanton et al. |
| 2008/0275551 A1 | 11/2008 | Alfieri |
| 2008/0281353 A1 | 11/2008 | Aranyi et al. |
| 2008/0281411 A1 | 11/2008 | Berreklouw |
| 2008/0287862 A1 | 11/2008 | Weitzner et al. |
| 2008/0288044 A1 | 11/2008 | Osborne |
| 2008/0288062 A1 | 11/2008 | Andrieu et al. |
| 2008/0294251 A1 | 11/2008 | Annest et al. |
| 2008/0300537 A1 | 12/2008 | Bowman |
| 2008/0300629 A1 | 12/2008 | Surti |
| 2008/0312506 A1 | 12/2008 | Spivey et al. |
| 2009/0024110 A1 | 1/2009 | Heideman et al. |
| 2009/0028670 A1 | 1/2009 | Garcia et al. |
| 2009/0043381 A1 | 2/2009 | Macoviak et al. |
| 2009/0054723 A1 | 2/2009 | Khairkhahan et al. |
| 2009/0054969 A1 | 2/2009 | Salahieh et al. |
| 2009/0062866 A1 | 3/2009 | Jackson |
| 2009/0076586 A1 | 3/2009 | Hauser et al. |
| 2009/0076600 A1 | 3/2009 | Quinn |
| 2009/0082797 A1 | 3/2009 | Fung et al. |
| 2009/0088837 A1 | 4/2009 | Gillinov et al. |
| 2009/0093877 A1 | 4/2009 | Keidar et al. |
| 2009/0099650 A1 | 4/2009 | Bolduc et al. |
| 2009/0105816 A1 | 4/2009 | Olsen et al. |
| 2009/0125102 A1 | 5/2009 | Cartledge et al. |
| 2009/0166913 A1 | 7/2009 | Guo et al. |
| 2009/0171439 A1 | 7/2009 | Nissl |
| 2009/0177266 A1 | 7/2009 | Powell et al. |
| 2009/0177274 A1 | 7/2009 | Scorsin et al. |
| 2009/0248148 A1 | 10/2009 | Shaolian et al. |
| 2009/0254103 A1 | 10/2009 | Deutsch |
| 2009/0264994 A1 | 10/2009 | Saadat |
| 2009/0287231 A1 | 11/2009 | Brooks et al. |
| 2009/0287304 A1 | 11/2009 | Dahlgren et al. |
| 2009/0299409 A1 | 12/2009 | Coe et al. |
| 2009/0326648 A1 | 12/2009 | Machold et al. |
| 2010/0001038 A1 | 1/2010 | Levin et al. |
| 2010/0010538 A1 | 1/2010 | Juravic et al. |
| 2010/0023118 A1 | 1/2010 | Medlock et al. |
| 2010/0030014 A1 | 2/2010 | Ferrazzi |
| 2010/0030328 A1 | 2/2010 | Seguin et al. |
| 2010/0042147 A1 | 2/2010 | Janovsky et al. |
| 2010/0049213 A1 | 2/2010 | Serina et al. |
| 2010/0063542 A1 | 3/2010 | van der Burg et al. |
| 2010/0063550 A1 | 3/2010 | Felix et al. |
| 2010/0076499 A1 | 3/2010 | McNamara et al. |
| 2010/0094248 A1 | 4/2010 | Nguyen et al. |
| 2010/0094314 A1 | 4/2010 | Hernlund et al. |
| 2010/0106141 A1 | 4/2010 | Osypka et al. |
| 2010/0114180 A1 | 5/2010 | Rock et al. |
| 2010/0121349 A1 | 5/2010 | Meier et al. |
| 2010/0121435 A1 | 5/2010 | Subramanian et al. |
| 2010/0121437 A1 | 5/2010 | Subramanian et al. |
| 2010/0130989 A1 | 5/2010 | Bourque et al. |
| 2010/0130992 A1 | 5/2010 | Machold et al. |
| 2010/0152845 A1 | 6/2010 | Bloom et al. |
| 2010/0161043 A1 | 6/2010 | Maisano et al. |
| 2010/0168845 A1 | 7/2010 | Wright |
| 2010/0174358 A1 | 7/2010 | Rabkin et al. |
| 2010/0179574 A1 | 7/2010 | Longoria et al. |
| 2010/0217184 A1 | 8/2010 | Koblish et al. |
| 2010/0217382 A1 | 8/2010 | Chau et al. |
| 2010/0234935 A1 | 9/2010 | Bashiri et al. |
| 2010/0249497 A1 | 9/2010 | Peine et al. |
| 2010/0249908 A1 | 9/2010 | Chau et al. |
| 2010/0249915 A1 | 9/2010 | Zhang |
| 2010/0249920 A1 | 9/2010 | Bolling et al. |
| 2010/0262232 A1 | 10/2010 | Annest |
| 2010/0262233 A1 | 10/2010 | He |
| 2010/0286628 A1 | 11/2010 | Gross |
| 2010/0298929 A1 | 11/2010 | Thornton et al. |
| 2010/0305475 A1 | 12/2010 | Hinchliffe et al. |
| 2010/0324598 A1 | 12/2010 | Anderson |
| 2011/0004210 A1 | 1/2011 | Johnson et al. |
| 2011/0004298 A1 | 1/2011 | Lee et al. |
| 2011/0009956 A1 | 1/2011 | Cartledge et al. |
| 2011/0011917 A1 | 1/2011 | Loulmet |
| 2011/0026208 A1 | 2/2011 | Utsuro et al. |
| 2011/0029066 A1 | 2/2011 | Gilad et al. |
| 2011/0035000 A1 | 2/2011 | Nieminen et al. |
| 2011/0066231 A1 | 3/2011 | Cartledge et al. |
| 2011/0067770 A1 | 3/2011 | Pederson et al. |
| 2011/0071626 A1 | 3/2011 | Wright et al. |
| 2011/0082538 A1 | 4/2011 | Dahlgren et al. |
| 2011/0087146 A1 | 4/2011 | Ryan et al. |
| 2011/0093002 A1 | 4/2011 | Rucker et al. |
| 2011/0118832 A1 | 5/2011 | Punjabi |
| 2011/0137410 A1 | 6/2011 | Hacohen |
| 2011/0144576 A1 | 6/2011 | Rothe et al. |
| 2011/0144703 A1 | 6/2011 | Krause et al. |
| 2011/0202130 A1 | 8/2011 | Cartledge et al. |
| 2011/0208283 A1 | 8/2011 | Rust |
| 2011/0230941 A1 | 9/2011 | Markus |
| 2011/0230961 A1 | 9/2011 | Langer et al. |
| 2011/0238088 A1 | 9/2011 | Bolduc et al. |
| 2011/0257433 A1 | 10/2011 | Walker |
| 2011/0257633 A1 | 10/2011 | Cartledge et al. |
| 2011/0264208 A1 | 10/2011 | Duffy et al. |
| 2011/0276062 A1 | 11/2011 | Bolduc |
| 2011/0288435 A1 | 11/2011 | Christy et al. |
| 2011/0301498 A1 | 12/2011 | Maenhout et al. |
| 2012/0053628 A1 | 3/2012 | Sojka et al. |
| 2012/0053642 A1 | 3/2012 | Lozier et al. |
| 2012/0065464 A1 | 3/2012 | Ellis et al. |
| 2012/0078355 A1 | 3/2012 | Zipory et al. |
| 2012/0078359 A1 | 3/2012 | Li et al. |
| 2012/0089022 A1 | 4/2012 | House et al. |
| 2012/0089125 A1 | 4/2012 | Scheibe et al. |
| 2012/0095552 A1 | 4/2012 | Spence et al. |
| 2012/0109155 A1 | 5/2012 | Robinson et al. |
| 2012/0143226 A1 | 6/2012 | Belson et al. |
| 2012/0150290 A1 | 6/2012 | Gabbay |
| 2012/0158021 A1 | 6/2012 | Morrill |
| 2012/0158023 A1 | 6/2012 | Mitelberg et al. |
| 2012/0179086 A1 | 7/2012 | Shank et al. |
| 2012/0191182 A1 | 7/2012 | Hauser et al. |
| 2012/0226349 A1 | 9/2012 | Tuval et al. |
| 2012/0239142 A1 | 9/2012 | Liu et al. |
| 2012/0245604 A1 | 9/2012 | Tegzes |
| 2012/0271198 A1 | 10/2012 | Whittaker et al. |
| 2012/0296349 A1 | 11/2012 | Smith et al. |
| 2012/0296417 A1 | 11/2012 | Hill et al. |
| 2012/0310330 A1 | 12/2012 | Buchbinder et al. |
| 2012/0323313 A1 | 12/2012 | Seguin |
| 2013/0030522 A1 | 1/2013 | Rowe et al. |
| 2013/0046373 A1 | 2/2013 | Cartledge et al. |
| 2013/0053884 A1 | 2/2013 | Roorda |
| 2013/0079873 A1 | 3/2013 | Migliazza et al. |
| 2013/0085529 A1 | 4/2013 | Housman |
| 2013/0090724 A1 | 4/2013 | Subramanian et al. |
| 2013/0096673 A1 | 4/2013 | Hill et al. |
| 2013/0116776 A1 | 5/2013 | Gross et al. |
| 2013/0123910 A1 | 5/2013 | Cartledge et al. |
| 2013/0131791 A1 | 5/2013 | Hlavka et al. |
| 2013/0166017 A1 | 6/2013 | Cartledge et al. |
| 2013/0190863 A1 | 7/2013 | Call et al. |
| 2013/0204361 A1 | 8/2013 | Adams et al. |
| 2013/0218206 A1 | 8/2013 | Gadlage |
| 2013/0226289 A1 | 8/2013 | Shaolian et al. |
| 2013/0226290 A1 | 8/2013 | Yellin et al. |
| 2013/0231701 A1 | 9/2013 | Voss et al. |
| 2013/0268069 A1 | 10/2013 | Zakai et al. |
| 2013/0282059 A1 | 10/2013 | Ketai et al. |
| 2013/0289718 A1 | 10/2013 | Tsukashima et al. |

(56) References Cited

U.S. PATENT DOCUMENTS

| | | |
|---|---|---|
| 2013/0297013 A1 | 11/2013 | Klima et al. |
| 2013/0304093 A1 | 11/2013 | Serina et al. |
| 2013/0331930 A1 | 12/2013 | Rowe et al. |
| 2014/0067054 A1 | 3/2014 | Chau et al. |
| 2014/0081394 A1 | 3/2014 | Keranen et al. |
| 2014/0088368 A1 | 3/2014 | Park |
| 2014/0088646 A1 | 3/2014 | Wales et al. |
| 2014/0094826 A1 | 4/2014 | Sutherland et al. |
| 2014/0094903 A1 | 4/2014 | Miller et al. |
| 2014/0094906 A1 | 4/2014 | Spence et al. |
| 2014/0114390 A1 | 4/2014 | Tobis et al. |
| 2014/0135799 A1 | 5/2014 | Henderson |
| 2014/0142619 A1 | 5/2014 | Serina et al. |
| 2014/0142695 A1 | 5/2014 | Gross et al. |
| 2014/0148849 A1 | 5/2014 | Serina et al. |
| 2014/0155783 A1 | 6/2014 | Starksen et al. |
| 2014/0163615 A1 | 6/2014 | Gadlage et al. |
| 2014/0163670 A1 | 6/2014 | Alon et al. |
| 2014/0163690 A1 | 6/2014 | White |
| 2014/0188108 A1 | 7/2014 | Goodine et al. |
| 2014/0188140 A1 | 7/2014 | Meier et al. |
| 2014/0188215 A1 | 7/2014 | Hlavka et al. |
| 2014/0194976 A1 | 7/2014 | Starksen et al. |
| 2014/0207231 A1 | 7/2014 | Hacohen et al. |
| 2014/0243859 A1 | 8/2014 | Robinson |
| 2014/0243894 A1 | 8/2014 | Groothuis et al. |
| 2014/0243963 A1 | 8/2014 | Sheps et al. |
| 2014/0251042 A1 | 9/2014 | Asselin et al. |
| 2014/0275757 A1 | 9/2014 | Goodwin et al. |
| 2014/0276648 A1 | 9/2014 | Hammer et al. |
| 2014/0296962 A1 | 10/2014 | Cartledge et al. |
| 2014/0303649 A1 | 10/2014 | Nguyen et al. |
| 2014/0303720 A1 | 10/2014 | Sugimoto et al. |
| 2014/0309661 A1 | 10/2014 | Sheps et al. |
| 2014/0309730 A1 | 10/2014 | Alon et al. |
| 2014/0343668 A1 | 11/2014 | Zipory et al. |
| 2014/0350660 A1 | 11/2014 | Cocks et al. |
| 2014/0379006 A1 | 12/2014 | Sutherland et al. |
| 2015/0018940 A1 | 1/2015 | Quill et al. |
| 2015/0051697 A1 | 2/2015 | Spence et al. |
| 2015/0081014 A1 | 3/2015 | Gross et al. |
| 2015/0094800 A1 | 4/2015 | Chawla |
| 2015/0100116 A1 | 4/2015 | Mohl et al. |
| 2015/0112432 A1 | 4/2015 | Reich et al. |
| 2015/0127097 A1 | 5/2015 | Neumann et al. |
| 2015/0133997 A1 | 5/2015 | Deitch et al. |
| 2015/0174363 A1 | 6/2015 | Sutermeister et al. |
| 2015/0182336 A1 | 7/2015 | Zipory et al. |
| 2015/0230919 A1 | 8/2015 | Chau et al. |
| 2015/0272586 A1 | 10/2015 | Herman et al. |
| 2015/0272734 A1 | 10/2015 | Sheps et al. |
| 2015/0282931 A1 | 10/2015 | Brunnett et al. |
| 2015/0351910 A1 | 12/2015 | Gilmore et al. |
| 2016/0008132 A1 | 1/2016 | Cabiri et al. |
| 2016/0029920 A1 | 2/2016 | Kronstrom |
| 2016/0030034 A1 | 2/2016 | Graul et al. |
| 2016/0058557 A1 | 3/2016 | Reich et al. |
| 2016/0113767 A1 | 4/2016 | Miller et al. |
| 2016/0120642 A1 | 5/2016 | Shaolian et al. |
| 2016/0120645 A1 | 5/2016 | Alon |
| 2016/0158008 A1 | 6/2016 | Miller et al. |
| 2016/0242762 A1 | 8/2016 | Gilmore et al. |
| 2016/0256149 A1 | 9/2016 | Sampson et al. |
| 2016/0256274 A1 | 9/2016 | Hayoz |
| 2016/0262755 A1 | 9/2016 | Zipory et al. |
| 2016/0302917 A1 | 10/2016 | Schewel |
| 2016/0317302 A1 | 11/2016 | Madjarov et al. |
| 2016/0346084 A1 | 12/2016 | Taylor et al. |
| 2016/0361058 A1 | 12/2016 | Bolduc et al. |
| 2016/0361168 A1 | 12/2016 | Gross et al. |
| 2016/0361169 A1 | 12/2016 | Gross et al. |
| 2017/0000609 A1 | 1/2017 | Gross et al. |
| 2017/0042670 A1 | 2/2017 | Shaolian et al. |
| 2017/0100119 A1 | 4/2017 | Baird et al. |
| 2017/0224489 A1 | 8/2017 | Starksen et al. |
| 2017/0245993 A1 | 8/2017 | Gross et al. |
| 2017/0296777 A1* | 10/2017 | Heisel ............... A61M 25/0108 |
| 2018/0008409 A1 | 1/2018 | Kutzik et al. |
| 2018/0049875 A1 | 2/2018 | Iflah et al. |
| 2018/0140420 A1 | 5/2018 | Hayoz et al. |
| 2018/0168803 A1 | 6/2018 | Pesce et al. |
| 2018/0228608 A1 | 8/2018 | Sheps et al. |
| 2018/0256334 A1 | 9/2018 | Sheps et al. |
| 2018/0280019 A1 | 10/2018 | Azar et al. |
| 2018/0289480 A1 | 10/2018 | D'ambra et al. |
| 2018/0318080 A1 | 11/2018 | Quill et al. |
| 2018/0318083 A1 | 11/2018 | Bolling et al. |
| 2019/0029498 A1 | 1/2019 | Mankowski et al. |
| 2019/0038411 A1 | 2/2019 | Alon |
| 2019/0091445 A1 | 3/2019 | House |
| 2019/0111239 A1 | 4/2019 | Bolduc et al. |
| 2019/0117400 A1 | 4/2019 | Medema et al. |
| 2019/0125325 A1 | 5/2019 | Sheps et al. |
| 2019/0151093 A1 | 5/2019 | Keidar et al. |
| 2019/0159898 A1 | 5/2019 | Kutzik et al. |
| 2019/0175344 A1 | 6/2019 | Khairkhahan |
| 2019/0175345 A1 | 6/2019 | Schaffner et al. |
| 2019/0175346 A1 | 6/2019 | Schaffner et al. |
| 2019/0183648 A1 | 6/2019 | Trapp et al. |
| 2019/0240023 A1 | 8/2019 | Spence et al. |
| 2019/0290260 A1 | 9/2019 | Caffes et al. |
| 2019/0290431 A1 | 9/2019 | Genovese et al. |
| 2019/0321049 A1 | 10/2019 | Herman et al. |
| 2019/0343633 A1 | 11/2019 | Garvin et al. |
| 2020/0015810 A1 | 1/2020 | Piccirillo |
| 2020/0015971 A1 | 1/2020 | Brauon et al. |
| 2020/0178956 A1 | 6/2020 | Mitelberg et al. |
| 2020/0289267 A1 | 9/2020 | Peleg et al. |
| 2020/0337840 A1 | 10/2020 | Reich |
| 2020/0390551 A1 | 12/2020 | McCarthy |
| 2021/0015475 A1 | 1/2021 | Lau |
| 2021/0052387 A1 | 2/2021 | Greenan et al. |
| 2021/0059820 A1 | 3/2021 | Clark et al. |
| 2021/0085461 A1 | 3/2021 | Neumark et al. |
| 2021/0093453 A1 | 4/2021 | Peleg et al. |
| 2021/0145584 A1 | 5/2021 | Kasher et al. |
| 2022/0071620 A1 | 3/2022 | Brauon et al. |
| 2022/0096232 A1 | 3/2022 | Skaro et al. |
| 2022/0110656 A1 | 4/2022 | Azar et al. |
| 2022/0142779 A1 | 5/2022 | Sharon |
| 2022/0233316 A1 | 7/2022 | Sheps et al. |
| 2022/0273436 A1 | 9/2022 | Aviv et al. |
| 2022/0313438 A1 | 10/2022 | Chappel-Ram |
| 2022/0323221 A1 | 10/2022 | Sharon et al. |
| 2023/0016867 A1 | 1/2023 | Tennenbaum |
| 2023/0218291 A1 | 7/2023 | Zarbatany et al. |
| 2023/0320856 A1 | 10/2023 | Zarbatany et al. |
| 2024/0008985 A1 | 1/2024 | Yuan et al. |
| 2024/0099736 A1 | 3/2024 | Elsheikh et al. |

FOREIGN PATENT DOCUMENTS

| | | | |
|---|---|---|---|
| CN | 113331995 A | 9/2021 | |
| EP | 1034753 A1 | 9/2000 | |
| EP | 3531975 A1 | 9/2019 | |
| GB | 2486124 A  * | 6/2012 | ........ A61M 25/0009 |
| WO | 9205093 A1 | 4/1992 | |
| WO | 9846149 A1 | 10/1998 | |
| WO | WO-2002085250 A2 | 10/2002 | |
| WO | 02085250 A3 | 2/2003 | |
| WO | 03047467 A1 | 6/2003 | |
| WO | WO-2007098512 A1 | 9/2007 | |
| WO | 2010000454 A1 | 1/2010 | |
| WO | WO-2012176195 A2 | 12/2012 | |
| WO | 2012176195 A3 | 3/2013 | |
| WO | 2014064964 A1 | 5/2014 | |
| WO | 2019145941 A1 | 8/2019 | |
| WO | 2019145947 A1 | 8/2019 | |
| WO | 2019182645 A1 | 9/2019 | |
| WO | 2019224814 A1 | 11/2019 | |
| WO | 2020240282 A2 | 12/2020 | |
| WO | 2021014440 A2 | 1/2021 | |
| WO | 2021038559 A1 | 3/2021 | |
| WO | 2021038560 A1 | 3/2021 | |

(56) References Cited

FOREIGN PATENT DOCUMENTS

| WO | WO-2022064401 A2 | 3/2022 |
|---|---|---|
| WO | WO-2022090907 A1 | 5/2022 |
| WO | WO-2022101817 A2 | 5/2022 |
| WO | WO-2022153131 A1 | 7/2022 |
| WO | WO-2022157592 A1 | 7/2022 |
| WO | WO-2022172108 A1 | 8/2022 |
| WO | WO-2022172149 A1 | 8/2022 |
| WO | WO-2022200972 A1 | 9/2022 |
| WO | WO-2022224071 A1 | 10/2022 |
| WO | WO-2022229815 A1 | 11/2022 |
| WO | WO-2022250983 A1 | 12/2022 |

OTHER PUBLICATIONS

Ahmadi, A., G. Spillner, and Th Johannesson. "Hemodynamic changes following experimental production and correction of acute mitral regurgitation with an adjustable ring prosthesis." The Thoracic and cardiovascular surgeon36.06 (1988): 313-319.
Ahmadi, Ali et al. "Percutaneously adjustable pulmonary artery band." The Annals of thoracic surgery 60 (1995): S520-S522.
Alfieri et al."Novel Suture Device for Beating-Heart Mitral Leaflet Approximation", Ann Thorac Surg. 2002, 74:1488-1493.
Alfieri et al., "An effective technique to correct anterior mitral leaflet prolapse," J Card 14(6):468-470 (1999).
Alfieri et al., "The double orifice technique in mitral valve repair: a simple solution for complex problems," Journal of Thoracic Cardiovascular Surgery 122:674-681 (2001).
Alfieri, "The edge-to-edge repair of the mitral valve," [Abstract] 6th Annual NewEra Cardiac Care: Innovation & Technology, Heart Surgery Forum pp. 103. (2000).
Amplatzer Cardiac Plug brochure (English pages), AGA Medical Corporation (Plymouth, MN) (copyright 2008-2010, downloaded Jan. 11, 2011).
Amplatzer® Cribriform Occluder. A patient guide to Percutaneous, Transcatheter, Atrial Septal Defect Closuer, AGA Medical Corporation, Apr. 2008.
Amplatzer® Septal Occluder. A patient guide to the Non-Surgical Closuer of the Atrial Septal Defect Using the Amplatzer Septal Occluder System, AGA Medical Corporation, Apr. 2008.
Assad, Renato S. "Adjustable Pulmonary Artery Banding." (2014).
Brennan, Jennifer, 510(k) Summary of safety and effectiveness, Jan. 2008.
Daebritz, S. et al. "Experience with an adjustable pulmonary artery banding device in two cases: initial success-midterm failure." The Thoracic and cardiovascular surgeon 47.01 (1999): 51-52.
Dang NC et al. "Simplified Placement of Multiple Artificial Mitral Valve Chords," The Heart Surgery Forum #2005-1005, 8 (3) (2005).
Dictionary.com definition of "lock", Jul. 29, 2013.
Dieter RS, "Percutaneous valve repair: Update on mitral regurgitation and endovascular approaches to the mitral valve," Applications in Imaging, Cardiac Interventions, Supported by an educational grant from Amersham Health pp. 11-14 (2003).
Elliott, Daniel S., Gerald W. Timm, and David M. Barrett. "An implantable mechanical urinary sphincter: a new nonhydraulic design concept." Urology52.6 (1998): 1151-1154.
Langer et al. Ring plus String: Papillary muscle repositioning as an adjunctive repair technique for ischemic mitral regurgitation, The Journal of Thoracic Cardiovascular surgery vol. 133 No. 1, Jan. 2007.
Langer et al. Ring+String, Successful Repair technique for ischemic mitral regurgitation with severe leaflet Tethering, The Department of Thoracic Cardiovascular surgery, Hamburg, Germany, Nov. 2008.
Maisano, "The double-orifice technique as a standardized approach to treat mitral," European Journal of Cardio-thoracic Surgery 17 (2000) 201-205.
O'Reilly S et al., "Heart valve surgery pushes the envelope," Medtech Insight 8(3): 73, 99-108 (2006).
Odell JA et al., "Early Results o4yf a Simplified Method of Mitral Valve Annuloplasty," Circulation 92:150-154 (1995).
Park, Sang C. et al. "A percutaneously adjustable device for banding of the pulmonary trunk." International journal of cardiology 9.4 (1985): 477-484.
Swain CP et al., "An endoscopically deliverable tissue-transfixing device for securing biosensors in the gastrointestinal tract," Gastrointestinal Endoscopy 40(6): 730-734 (1994).
Swenson, O. and Malinin, T.I., 1978. An improved mechanical device for control of urinary incontinence. Investigative urology, 15(5), pp. 389-391.
Swenson, Orvar. "Internal device for control of urinary incontinence." Journal of pediatric surgery 7.5 (1972): 542-545.
Tajik, Abdul, "Two dimensional real-time ultrasonic imaging of the heart and great vessels", Mayo Clin Proc. vol 53:271-303, 1978.
Swenson O., "An Experimental Implantable Urinary Sphincter," Journal—Invest Urol, Sep. 1976, vol. 14, No. 2, pp. 100-103.

* cited by examiner

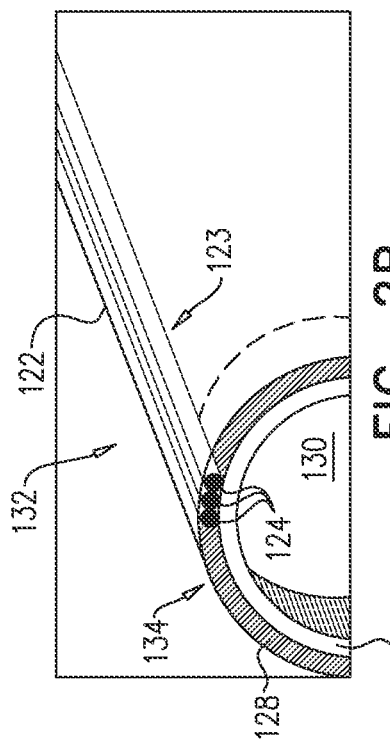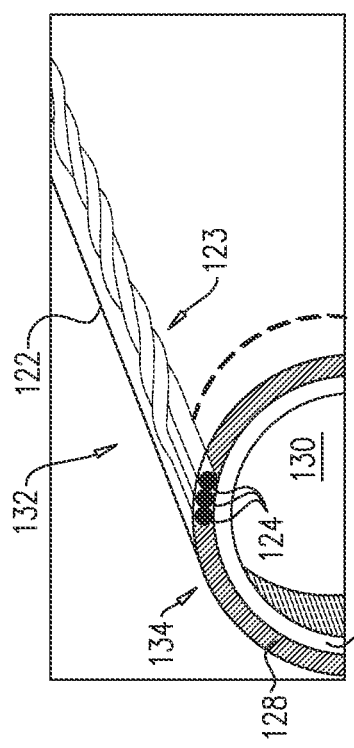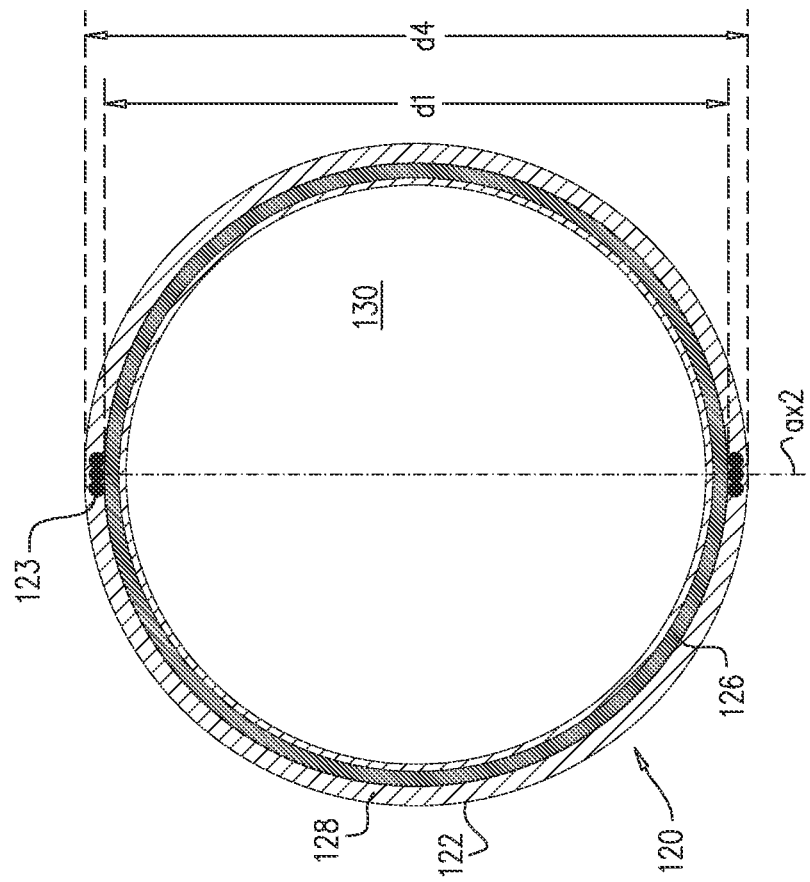

LOW-PROFILE STEERABLE CATHETER

CROSS-REFERENCE TO RELATED APPLICATIONS

The present application is a Continuation of International Patent Application PCT/IL2020/050926 to Keidar, filed Aug. 25, 2020, which published as WO 2021/038560, and which claims the benefit of U.S. Provisional Patent Application No. 62/893,093 to Keidar, filed Aug. 28, 2019, which is incorporated by reference herein for all purposes.

BACKGROUND

Steerable catheters can comprise a flexible tube, a pull-ring at a distal portion of the tube, and one or more pull-wires. The tube comprises a circumferential wall that defines an elongate lumen between the distal portion of the tube and a proximal portion of the tube. The pull-wires can extend, in association with the wall, from the proximal portion to the distal portion, where they can be coupled to a pull-ring.

Percutaneous catheters benefit from an outer diameter that is as small as possible for advancement of the catheter through the anatomy, and an inner diameter that is as large as possible for advancement of articles through the catheter. For some catheters, where the pull-wires are coupled to the pull-ring, the pull-wires may be arranged to overlap the pull-ring in order to maximize contact between these elements and increase the mechanical strength of the coupling. However, this may disadvantageously thicken the wall of the catheter, thereby increasing the outer diameter and/or reducing the inner diameter of the catheter.

SUMMARY OF THE INVENTION

This summary is meant to provide some examples and is not intended to be limiting of the scope of the invention in any way. For example, any feature included in an example of this summary is not required by the claims, unless the claims explicitly recite the features. Also, the features described can be combined in a variety of ways. Various features and steps as described elsewhere in this disclosure can be included in the examples summarized here.

A steerable catheter is provided, comprising a flexible tube with a pull-ring at a distal portion of the tube. At least one pull-wire extends, in association with a wall of the tube, between the distal portion and a proximal portion of the tube. The at least one pull-wire is coupled to the pull-ring, and is slidable with respect to the wall, such that proximal pulling (i.e., tensioning) of the at least one pull-wire bends the distal portion of the tube. The pull-ring is shaped and is elastically deformable such that, (i) during advancement of the catheter through the vasculature, an outer diameter of the tube is not adversely increased by the presence of the at least one pull-wire coupled to the pull-ring, and (ii) during advancement of an article through the lumen of the tube, an inner diameter of the tube is not adversely reduced by the need to accommodate the at least one pull-wire and the pull-ring within a small outer diameter of the tube.

The pull-ring may have (i) a first state in which the pull-ring is elliptical and has a first eccentricity, and (ii) a second state in which the pull-ring is elliptical and has a second eccentricity that is smaller than the first eccentricity. The pull-ring may be biased toward assuming the first state, and elastically deformable toward the second state.

There is therefore provided, in accordance with an application of the present invention, apparatus including a steerable catheter, the steerable catheter including a flexible tube, at least one pull-wire, and a pull-ring.

The flexible tube has a proximal portion (e.g., a proximal end) and a distal portion (e.g., a distal end), at least the distal portion being percutaneously advanceable into a subject. The flexible tube includes a circumferential wall that defines an elongate lumen between the proximal portion or proximal end and/or the distal portion or distal end.

The at least one pull-wire may extend, in association with the wall, from the proximal portion to the distal portion. The at least one pull-wire may be axially slidable with respect to the wall at least at the proximal portion. In some implementations, the at least one pull-wire extends within a secondary lumen extending within the wall of the tube.

At the distal portion of the tube, the pull-ring may be coupled to the wall such that the pull-ring circumscribes the lumen. The pull-ring is typically coupled to the at least one pull-wire, such that pulling on the at least one pull-wire bends the distal portion of the tube.

The pull-ring may have (i) a first state in which the pull-ring is elliptical and has a first eccentricity, and (ii) a second state in which the pull-ring is elliptical and has a second eccentricity that is smaller than the first eccentricity. The pull-ring may be biased toward assuming the first state and may be elastically deformable toward the second state. Herein, the term "eccentricity" means the numerical eccentricity as opposed to the linear eccentricity. The numerical eccentricity of a circle is zero. The numerical eccentricity of an ellipse which is not a circle is strictly greater than zero, but strictly less than 1. Therefore, when the pull-ring transitions from the first state to the second state, the pull-ring becomes less elliptical and more circular. More specifically, the pull-ring may have (i) a first state in which the pull-ring is noncircular elliptical, and has a minor diameter along a minor axis and a major diameter along a major axis, and (ii) a second state in which the pull-ring is circular and has a diameter that is equal to the major diameter of the pull-ring when the pull-ring is in the first state. Hence, the circumference of the pull-ring is smaller in the first state than in the second state. The first state of the expandable pull-ring is particularly advantageous during advancement of the catheter toward a target site, and the second state of the expandable pull-ring is particularly advantageous when the catheter has reached the target site.

In an application, the pull-ring, in at least the first state, defines a major axis and a minor axis, and the pull-ring is shaped to define a tension spring at each intersection of the major axis with the pull-ring.

In an application, the pull-ring is disposed at an axial site at the distal portion of the tube, the tube has an outer surface, and in the first state of the pull-wire, the outer surface of the tube at the axial site is circular in transverse cross-section. In some embodiments, an outer diameter of the tube at the axial site when the pull-ring is in the first state is equal to an outer diameter of the proximal portion of the tube.

In an application, the pull-ring is disposed at an axial site at the distal portion of the tube, the tube has an outer surface, and in the second state of the pull-wire, the outer surface of the tube at the axial site is non-circular elliptical in transverse cross-section. In some embodiments, a diameter of the noncircular elliptical pull-ring along the major axis when the pull-ring is in the first state is equal to a diameter of the circular pull-ring when the pull-ring is in the second state. Still preferably, an inner diameter of the tube at the axial site when the expandable pull-ring is in the second state is equal to an inner diameter of the proximal portion of the tube.

In an application, the tube is a first flexible tube, and defines, at the distal end, a distal opening out of the lumen, and the apparatus further includes a second flexible tube, advanceable distally through the lumen, past the pull-ring, and out of the distal opening, the second tube dimensioned such that advancement of the second tube through the lumen past the pull-ring elastically deforms the pull-ring toward the second state. The elastic deformation enlarges the circumference of the pull-ring as it transitions from the first state to the second state.

In an application, the at least one pull-wire is a first pull-wire, and the apparatus further includes a second pull-wire that extends, in association with the wall, from the proximal portion to the distal portion, and is axially slidable with respect to the wall at least at the proximal portion, and is coupled to the pull-ring opposite the first pull-wire. The first and second pull-wires can be configured to extend within the wall of the flexible tube.

In an application, the tube, at the proximal portion, is circular in transverse cross-section.

In an application, the pull-ring, in the second state, is circular. Hence, when the pull-ring is in the second state, the tube at the axial site is elliptical in transverse cross-section.

In an application, the pull-ring has (i) an inner surface that faces radially inward toward the lumen, and (ii) an outer surface that faces radially outward from the lumen, and the at least one pull-wire is attached to the outer surface of the pull-ring.

In an Application:
the tube defines, at the distal portion and/or distal end, a distal opening out of the lumen,
the apparatus further includes a dilator, shaped to define:
a shaft, extending through the lumen;
a head; and
a neck, connecting the shaft to the head, and disposed within the pull-ring, the head extending distally away from the pull-ring and out of the distal opening, and
the dilator is dimensioned such that axial movement of the head through the pull-ring elastically deforms the pull-ring toward the second state. The dilator can be a transseptal dilator, but can also be used for other procedures.

In an application, the pull-ring is disposed at an axial site at the distal portion of the tube, and the neck is shaped to fit snugly within the lumen at the axial site. In particular, the shape of the neck can match the shape of the pull-ring in its first state.

In an application, the dilator is dimensioned such that the pull-ring resists axial movement of the neck away from the pull-ring.

In an application, the neck is noncircular in transverse cross-section.

In an application, the neck is noncircular elliptical in transverse cross-section. The transverse cross-section of the neck can correspond to the transverse cross-section of the pull-ring in its first state.

In an application, the head is conical.

In an Application:
the head has a widest part, and tapers away from the widest part and from the neck, and
in at least one longitudinal cross-section, a narrowest portion of the neck is narrower than the widest part of the head.

In an Application:
the pull-ring, in at least the first state, defines a major axis and a minor axis, and the pull-wire is attached to the pull-ring at a circumferential position on the pull-ring that is within 10 degrees of the minor axis.

In an application, the circumferential position is on the minor axis, and the pull-wire is attached to the pull-ring at the circumferential position that is on the minor axis.

There is further provided, in accordance with an application of the present invention, a method, including:
transluminally advancing a distal portion of a flexible tube into a body chamber of a subject, and:
the tube includes a circumferential wall that defines an elongate lumen from a proximal portion of the tube to the distal portion,
the distal portion is shaped to define a distal opening out of the lumen, and
at the distal portion, an elliptical pull-ring is coupled to the wall such that the pull-ring circumscribes the lumen, the pull-ring being in a first state in which the pull-ring has a first eccentricity; and
while the distal portion is disposed in the body chamber, advancing an article through the lumen such that a distal end of the article passes the pull-ring and elastically deforms the pull-ring into a second state in which the pull-ring has a second eccentricity that is smaller than the first eccentricity.

In an application, advancing the distal portion of the flexible tube includes advancing the distal portion of the flexible tube while the distal portion is circular in transverse cross-section.

In an application, advancing the article through the lumen includes advancing the article through the lumen such that the distal end of the article passes the pull-ring and elastically deforms the distal portion of the flexible tube to become noncircular elliptical in transverse cross-section.

In an application, advancing the article through the lumen includes advancing the article through the lumen such that the distal end of the article passes the pull-ring and elastically deforms the pull-ring into a second state in which the pull-ring is circular in transverse cross-section.

In an application, the flexible tube is a first flexible tube, the article includes a second flexible tube, and advancing the article through the lumen includes advancing the second flexible tube through the lumen.

In an application, advancing the distal portion includes advancing the distal portion while a transseptal dilator is arranged with respect to the tube such that a head of the dilator extends out of the distal opening, a neck of the dilator is disposed within the pull-ring, and a shaft of the dilator extends from the neck proximally through the lumen.

In an application, the method further includes, while the distal portion is disposed in the body chamber, and prior to advancing the article through the lumen, proximally withdrawing the dilator such that movement of the head through the pull-ring elastically deforms the pull-ring toward the second state.

This method can be performed on a living animal or on a simulation, such as on a cadaver, cadaver heart, simulator (e.g. with the body parts, tissue, etc. being simulated), etc.

There is further provided, in accordance with an application of the present invention, a system and/or apparatus including a steerable catheter, the steerable catheter including:
a flexible tube:
having a proximal portion and a distal portion, at least the distal portion being percutaneously advanceable into a subject, and including a circumferential wall that defines an elongate lumen between the proximal portion and the distal portion;

a pull-ring at the distal portion of the tube, coupled to the wall such that the pull-ring circumscribes the lumen;

a first bundle of pull-wires, extending, from the proximal portion to the distal portion, in association with the wall on a first lateral side of the lumen, and coupled to the pull-ring such that pulling on the first bundle bends the distal portion of the tube in a first direction; and a second bundle of pull-wires, extending, from the proximal portion to the distal portion, in association with the wall on a second lateral side of the lumen, and coupled to the pull-ring opposite the first bundle such that pulling on the second bundle bends the distal portion of the tube in a second direction that is opposite to the first direction.

In an application, each of the pull-wires of the first bundle and of the second bundle has insufficient tensile strength, on its own, to bend the distal portion of the tube when pulled.

In an application, for each of the bundles, the pull-wires of the bundle extend, from the proximal portion to the distal portion, parallel with each other.

In an application, for each of the bundles, the pull-wires of the bundle extend, from the proximal portion to the distal portion, twisted around each other.

In an application, for each of the first bundle and the second bundle, at a distal end of the bundle, the pull-wires of the bundle are untwisted and the bundle is flattened such that each of the pull-wires of the bundle contacts the pull-ring.

The present invention will be more fully understood from the following detailed description of applications thereof, taken together with the drawings, in which:

BRIEF DESCRIPTION OF THE DRAWINGS

FIGS. 2A-C are schematic illustrations of a steerable catheter comprising a flexible tube, one or more bundles of pull-wires, and a pull-ring, in accordance with some applications of the invention.

DETAILED DESCRIPTION OF EMBODIMENTS

Figure 1:
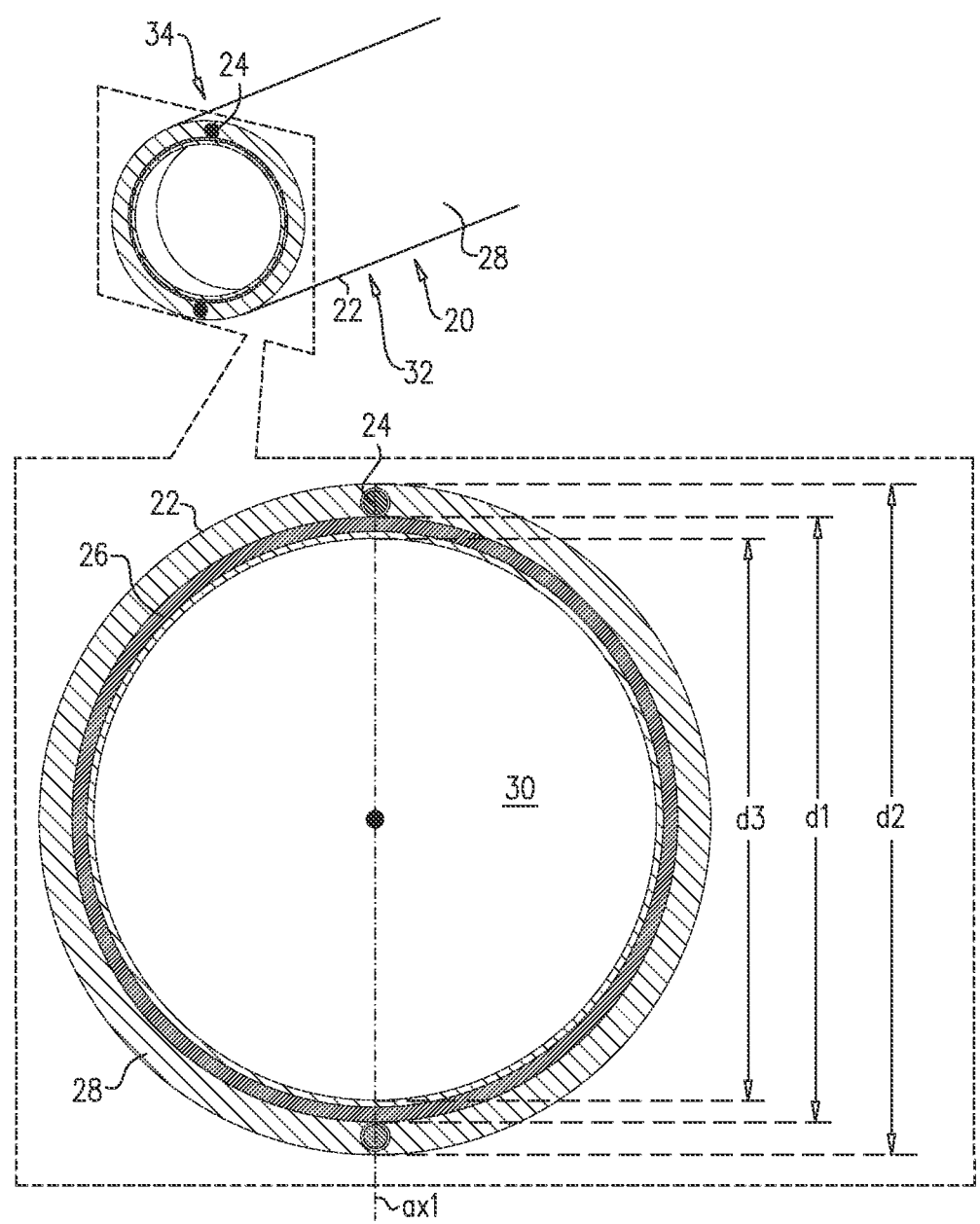
FIG. 1 is a schematic illustration of a prior art steerable catheter comprising a flexible tube, one or more pull-wires, and a pull-ring.

Each of the catheters described herein, including the prior art catheter of FIG. 1, comprises a flexible tube, one or more pull-wires, and a pull-ring. Each catheter has a proximal portion and a distal portion, at least the distal portion being percutaneously (e.g., transluminally) advanceable into a subject. The tube comprises a circumferential wall that defines an elongate lumen between the proximal portion of the catheter and the distal portion of the catheter (e.g., between a proximal end and a distal end of the catheter). The pull-ring is attached to the tube at an axial site of the tube, within the distal portion of the tube (e.g., at or close to a distal end of the tube), where it is coupled to the wall such that the pull-ring circumscribes the lumen. For example, the pull-ring may be embedded in the wall. Each pull-wire extends, in association with the wall, from the proximal portion of the catheter to the distal portion of the catheter (e.g., to the axial site), where it is coupled to the pull-ring. Tensioning a given pull-wire (e.g., by pulling proximally from a proximal end) bends the distal portion of the tube, e.g., toward the side on which the given pull-wire is disposed. To facilitate this, each pull-wire may be axially slidable with respect to the wall (at least at the proximal portion).

Typically, the pull-wires are embedded within the wall of the catheter (e.g., slidably disposed within a secondary lumen within the wall). The pull-ring can also be embedded within the wall, such that the material of the wall covers both an inner surface and an outer surface of the pull-ring. The wall can comprise multiple layers (e.g., of one or more polymers) that are fused together. At the axial site at which the pull-ring is disposed, the wall is typically sufficiently thick to cover the pull-ring and the pull-wire(s).

Reference is made to FIG. 1, which is a schematic illustration of a prior art steerable catheter 20 comprising a flexible tube 22, one or more (e.g., two) pull-wires 24, and a pull-ring 26. Catheter 20 (e.g., tube 22 thereof) has a proximal portion (not shown) and a distal portion 32, at least the distal portion being percutaneously (e.g., transluminally) advanceable into a subject. Tube 22 comprises a circumferential wall 28 that defines an elongate lumen 30 between the proximal portion of catheter 20 and distal portion 32.

Each pull-wire 24 extends, in association with wall 28, from the proximal portion of catheter 20 to distal portion 32, and is axially slidable with respect to the wall at least at the proximal portion.

Pull-ring 26 is disposed at an axial site 34 of tube 22, within distal portion 32, where it is coupled to wall 28 such that the pull-ring circumscribes lumen 30. For example, pull-ring 26 may be embedded in wall 28. Pull-ring 26 is coupled to each pull-wire 24 at axial site 34 such that pulling on a given pull-wire bends the distal portion of the tube, e.g., toward the side on which the given pull-wire is disposed.

Each pull-wire 24 is disposed on a transverse axis ax1 of catheter 20. Axis ax1 typically passes through the pull-wire and a central longitudinal axis of the catheter. For applications in which catheter 20 comprises two pull-wires 24, both of the pull-wires are disposed on axis ax1, diametrically opposite each other. That is, axis ax1 is defined, on a transverse cross-section of catheter 20, between the pull-wires, and the central longitudinal axis of the catheter typically also lies on axis ax1. Because axis ax1 is defined between the pull-wires, axis ax1 also can define the steering plane of catheter 20.

It is often advantageous for a percutaneous catheter to have a small outer diameter, and advantageous to minimize the difference between the inner diameter of the catheter and the outer diameter of the catheter, in order to (i) enable advancement of the catheter through small apertures while (ii) maximizing the space available within the catheter for articles (e.g., implants and/or tools) to pass through. Pull-ring 26 is circular (when viewed in a transverse cross-section of catheter 20) and has an outer surface that defines an outer diameter d1 of the pull-ring. The difference between the outer diameter of catheter 20 (e.g., tube 22) and the inner diameter of the catheter (i.e., a width of lumen 30) is at least partly dependent on a wall thickness of the pull-ring. However, this difference is also partly dependent on the thickness (e.g., diameter) of pull-wires 24, which are often attached to pull-ring 26 at the outer surface of the pull-ring. Pull-wires 24 must withstand the forces (e.g., tension) that will be applied in order to bend tube 22, and this strength is typically achieved, inter alia, by the pull-wires being sufficiently thick. Therefore, at least on transverse axis ax1, catheter 20 (e.g., tube 22) has an outer diameter d2 that is greater than its inner diameter, typically by at least twice the wall thickness of pull-ring 26 plus the thickness of each pull-wire 24 disposed on axis ax1. The thickness of the material of wall 28 also generally contributes to the difference between the outer and inner diameters.

Reference is made to FIGS. 2A-C, which are schematic illustrations of a steerable catheter 120 comprising a flexible tube 122, one or more (e.g., two, three, four, etc.) bundles 123 of pull-wires 124, and a pull-ring 126, in accordance with some applications of the invention. For some applications, pull-ring 126 is identical to pull-ring 26.

Catheter 120 (e.g., tube 122 thereof) has a proximal portion (not shown) and a distal portion 132, at least the distal portion being percutaneously (e.g., transluminally) advanceable into a subject. Tube 122 comprises a circumferential wall 128 that defines an elongate lumen 130 between the proximal portion of catheter 120 and distal portion 132 (e.g., between a proximal end and a distal end of the catheter).

Each bundle 123 extends, in association with wall 128, from the proximal portion of catheter 120 to distal portion 132, and is axially slidable with respect to the wall at least at the proximal portion.

Pull-ring 126 is disposed at an axial site 134 of tube 122, within distal portion 132, where it is coupled to wall 128 such that the pull-ring circumscribes lumen 130. For example, pull-ring 126 may be embedded in wall 128. Pull-ring 126 is coupled to each bundle 123 at axial site 134 such that pulling on a given bundle bends the distal portion of the tube, e.g., toward the side on which the given bundle is disposed.

Each bundle 123 is disposed on a transverse axis ax2 of catheter 120. Axis ax2 typically that passes through the bundle and a central longitudinal axis of the catheter. For applications in which catheter 120 comprises two bundles 123, both of the bundles are typically disposed on axis ax2, diametrically opposite each other. That is, axis ax2 is typically defined, on a transverse cross-section of catheter 120, between the bundles, and typically the central longitudinal axis of the catheter intersects axis ax2.

Each pull-wire 124 is thinner, and typically weaker, than pull-wire 24. For some applications, each pull-wire 124 has insufficient tensile strength, on its own, to bend the distal portion of the tube 122 when pulled. However, collectively, the plurality of pull-wires 124 in each bundle 123 provide the bundle with sufficient strength to bend the tube. At least at axial site 134 the pull-wires 124 of each bundle 123 are disposed adjacent to each other, circumferentially arranged around a small portion of pull ring 126, such that each of the pull-wires is flat against the pull-ring.

Because each pull-wire 124 is thinner than pull-wire 24, at least at axial site 134 bundles 123 have a flattened profile compared to pull-wire 24, the bundles being thinner on the transverse axis ax2 on which they are disposed. Therefore, at least at the axial site 134 at which the pull-ring is disposed, the difference between an outer diameter d4 of catheter 120 and an inner diameter of the catheter (at site 134) is advantageously smaller than the difference between the outer and inner diameters of catheter 20. In the example shown, the outer diameter of pull-ring 126 is d1 (i.e., the same as that of pull-ring 26), and therefore it is possible for outer diameter d4 of catheter 120 to be smaller than outer diameter d2 of catheter 20.

For some applications, and as shown in FIG. 2B, the pull-wires 124 of each bundle extend, in parallel with each other, between the proximal portion of the tube and distal portion 132. For some applications, and as shown in FIG. 2C, the pull-wires 124 of each bundle are twisted (e.g., braided) around each other between the proximal portion and distal portion 132—but nonetheless, at axial site 134, the bundle is flattened such that the pull-wires 124 of each bundle 123 are disposed adjacent to each other, circumferentially arranged around a small portion of pull ring 126, such that each of the pull-wires is flat against the pull-ring.

Reference is made to FIGS. 3A-B, 4, and 5A-D, which are schematic illustrations of a steerable catheter 220, and a system 200 comprising catheter 220, in accordance with some applications of the invention. Like catheter 120, catheter 220 is configured to provide, at its distal portion (e.g., at its pull-ring) an outer diameter that is sufficiently small for percutaneous (e.g., transluminal) advancement, and an inner diameter that is sufficiently large for advancement of articles (e.g., implants and/or tools) therethrough. In catheter 220, this is achieved by providing the small outer diameter specifically during percutaneous advancement and providing the large inner diameter specifically during advancement of implants and/or tools therethrough. During percutaneous advancement of the catheter, the large inner diameter is sacrificed in order to provide the small outer diameter. Once the distal portion of the catheter has reached the target site, the small outer diameter is sacrificed in order to provide the large inner diameter for advancement of articles through the catheter.

Catheter 220 comprises a flexible tube 222, one or more (e.g., two, three, four, etc.) pull-wires 224, and a pull-ring 226. Catheter 220 (e.g., tube 222 thereof) has a proximal portion (not shown) and a distal portion 232, at least the distal portion being percutaneously (e.g., transluminally) advanceable into a subject. Tube 222 comprises a circumferential wall 228 that defines an elongate lumen 230 between the proximal portion of catheter 220 and distal portion 232 (e.g., between a proximal end and a distal end of the catheter).

Each pull-wire 224 extends, in association with wall 228, from the proximal portion of catheter 220 to distal portion 232 and is axially slidable with respect to the wall at least at the proximal portion.

Pull-ring 226 is disposed at an axial site 234 of tube 222, within distal portion 232, where it is coupled to wall 228 such that the pull-ring circumscribes lumen 230. For example, pull-ring 226 may be embedded in wall 228. Pull-ring 226 is coupled to each pull-wire 224 at axial site 234 such that pulling on a given pull-wire bends the distal portion of the tube, e.g., toward the side on which the given pull-wire is disposed. Pull-ring 226 has an inner surface that faces radially inward toward the lumen, and an outer surface that faces radially outward from the lumen, and the one or more pull-wires are often attached to the outer surface of the pull-ring. The one or more pull-wires can generally also be attached to the inner surface of the pull-ring, or at least one of the pull-wires can be attached to the outer surface and the other of the pull-wires can be attached to the inner surface.

Each pull-wire 224 can be disposed on a transverse axis ax3 of catheter 220. Axis ax3 typically passes through the pull-wire and a central longitudinal axis of the catheter (e.g., axis ax3 is perpendicular to central longitudinal axis of the catheter). For applications in which catheter 220 comprises two pull-wires 224, both of the pull-wires are often disposed on axis ax3, diametrically opposite each other. That is, axis ax3 is often defined, on a transverse cross-section of catheter 220, between the pull-wires, and the central longitudinal axis of the catheter intersects axis ax3.

Figure 3A:
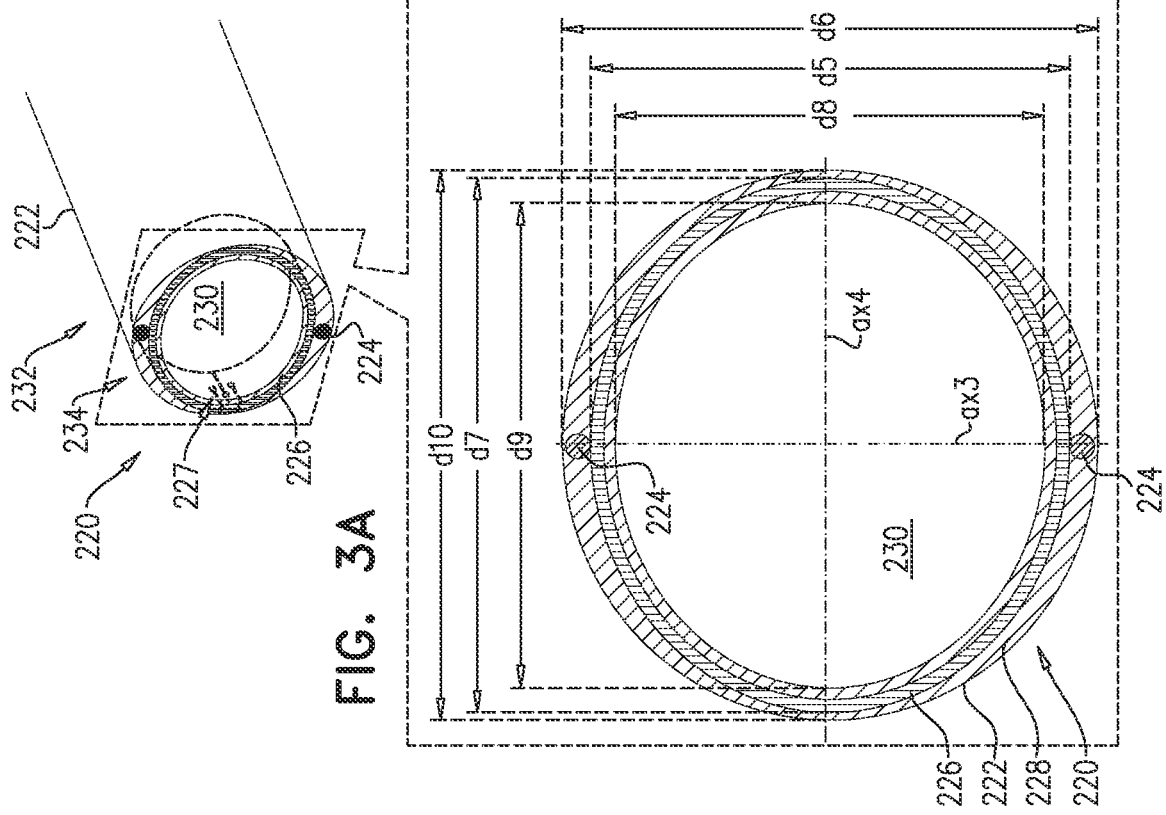
FIGS. 3A-B, 4, and 5A-D are schematic illustrations of a steerable catheter, and a system comprising the catheter, in accordance with some applications of the invention.
Figure 3B:
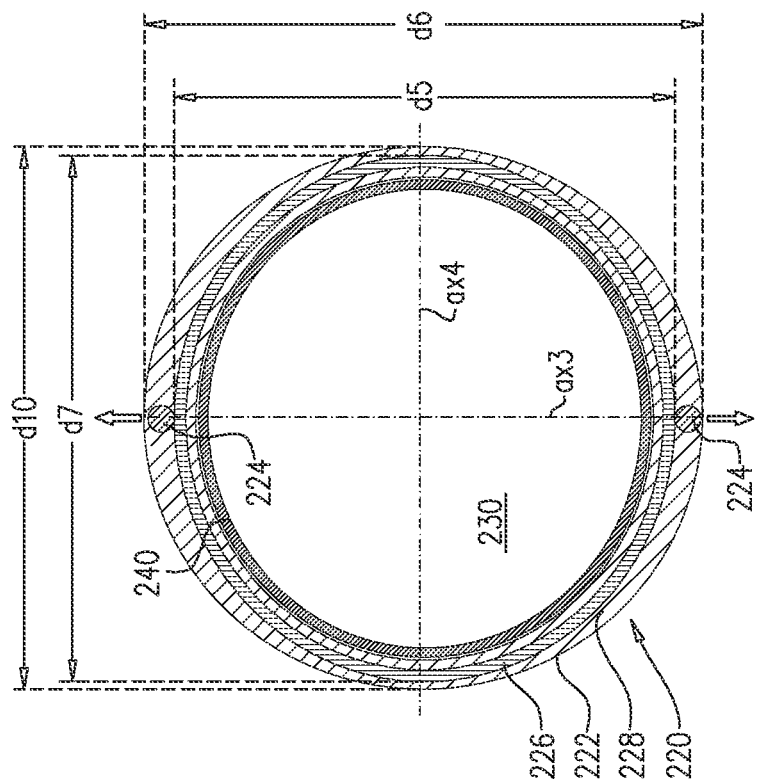

In a first state of pull-ring 226 (FIG. 3A), the pull-ring is elliptical and has a first eccentricity, and in a second state of the pull-ring, the pull-ring is elliptical and has a second eccentricity that is smaller than the first eccentricity (FIG. 3B). For example, and as shown, in transverse cross-section, pull-ring 226 may be noncircular elliptical in the first state, and circular in the second state.

Pull-ring 226 is biased toward assuming the first state and is elastically deformable toward the second state. Therefore, the first state may be considered to be a resting or default state.

In the first state of pull-ring 226, the noncircular elliptical shape of the pull-ring defines a major axis ax4 and defines axis ax3 as a minor axis. That is, pull-wires 224 can be disposed on minor axis ax3 of the noncircular elliptically-shaped pull-ring, at respective circumferential positions opposite each other on the pull-ring. However, for some applications pull-wires 224 are disposed partway around the pull-ring from axis ax3, such as within 10 degrees of the minor axis.

In its first state, a minor outer diameter d5 of pull-ring 226 along minor axis ax3 is smaller than a major outer diameter d7 of the pull-ring along major axis ax4. When pull-ring 226 is in its first state, an outer diameter d6 of catheter 220 along minor axis ax3 can be equal to an outer diameter d10 of catheter 220 along major axis ax4, so that catheter 220 has a circular cross-section at axial site 234. In this way, catheter 220 may have a smooth outer surface along its entire length.

It is to be noted that minor axis ax3 lies on (or defines) the steering plane of catheter 220, and major axis ax4 is orthogonal to the steering plane of the catheter.

For some applications, pull-ring 226 comprises or is shaped to define a tension spring 227 at each intersection of major axis ax4 with the pull-ring, in order to bias the pull-ring toward assuming the first state. Tension spring 227 allows elastic expansion of pull-ring 226. For example, tension spring 227 allows pull-ring 226 to transition from its first state to its second state. More specifically, tension spring 227 allows noncircular pull-ring 226 to assume a circular shape, e.g., by allowing outer diameter d5 of pull-ring 226 along minor axis ax3 to expand to outer diameter d7 of pull-ring 226 along major axis ax4. When pull-ring 226 is in its second state, catheter 220 may have the same inner diameter, e.g., inner diameter d9 along major axis ax4 in the first state of pull-ring 226, along its entire length, which facilitates insertion of catheters or articles through lumen 230. In such applications, when pull-ring 226 transitions from its first state to its second state, the transverse cross-section of catheter 220 at axial site 234 transitions from a circular to a noncircular shape. In other words, tension spring 227 is configured to allow a first half of pull-ring 226 to move radially away from a second half of pull-ring 226. Tension spring 227 may be realized by one or more (e.g., three) slits in pull-ring 226 at each intersection of major axis ax4 with pull-ring 226 (FIG. 3A). However, other configurations of tension springs 227 are also possible. For example, a tension spring 227 could be formed by a corrugated portion of pull-ring 226. It will be understood that tension springs 227 can be located at other positions along the circumference of the pull-ring 226, either in lieu of or in addition to tension springs 227 located at the two intersections of major axis ax4 with pull-ring 226. Circumferential wall 228 can be made of a material, typically a polymer, allowing elastic expansion of tube 222 at least at axial site 234. In applications where circumferential wall 228 comprises a braided layer, e.g. a steel braid, axial site 234 may be left unbraided to allow the expansion of tube 222. Optionally, the material of the braid at least at the axial site 234 can be an elastomer, such as Nylon. For some applications, pull-ring 226 does not comprise a discrete spring, but is generally shape-set to be biased toward assuming the first state. In other applications, pull-ring 226 is made of an elastically extensible material. Generally, the circumference of the pull-ring is smaller in the first state than in the second state.

For a catheter that comprises two pull-wires opposite each other, at the axial site of the pull-ring, and on the minor (or transverse) axis ax3 at which the pull-wires are coupled to the pull-ring of the catheter (i.e., on the steering plane of the catheter), the outer diameter of the catheter is at least the sum of (i) the outer diameter of the pull-ring, and (ii) the thickness of each pull-wire. This outer diameter would be greater than the outer diameter required on major axis ax4 (which is orthogonal to the steering plane) since none of the pull-wires lie on major axis ax4. That is, although on major axis ax4 it may be possible for the catheter to have an outer diameter that is insignificantly larger than the outer diameter of the pull-ring, on minor axis ax3 that lies on the steering plane the outer diameter of the catheter must be greater by at least the thickness of both pull-wires. Therefore, if the anatomy through which such a catheter must be advanced requires the outer diameter of the catheter to be no greater than a given outer diameter, the inner diameter of the catheter must disadvantageously be smaller than the given outer diameter by at least the thickness of the pull-wires and the thickness of the pull-ring.

Figure 5A:
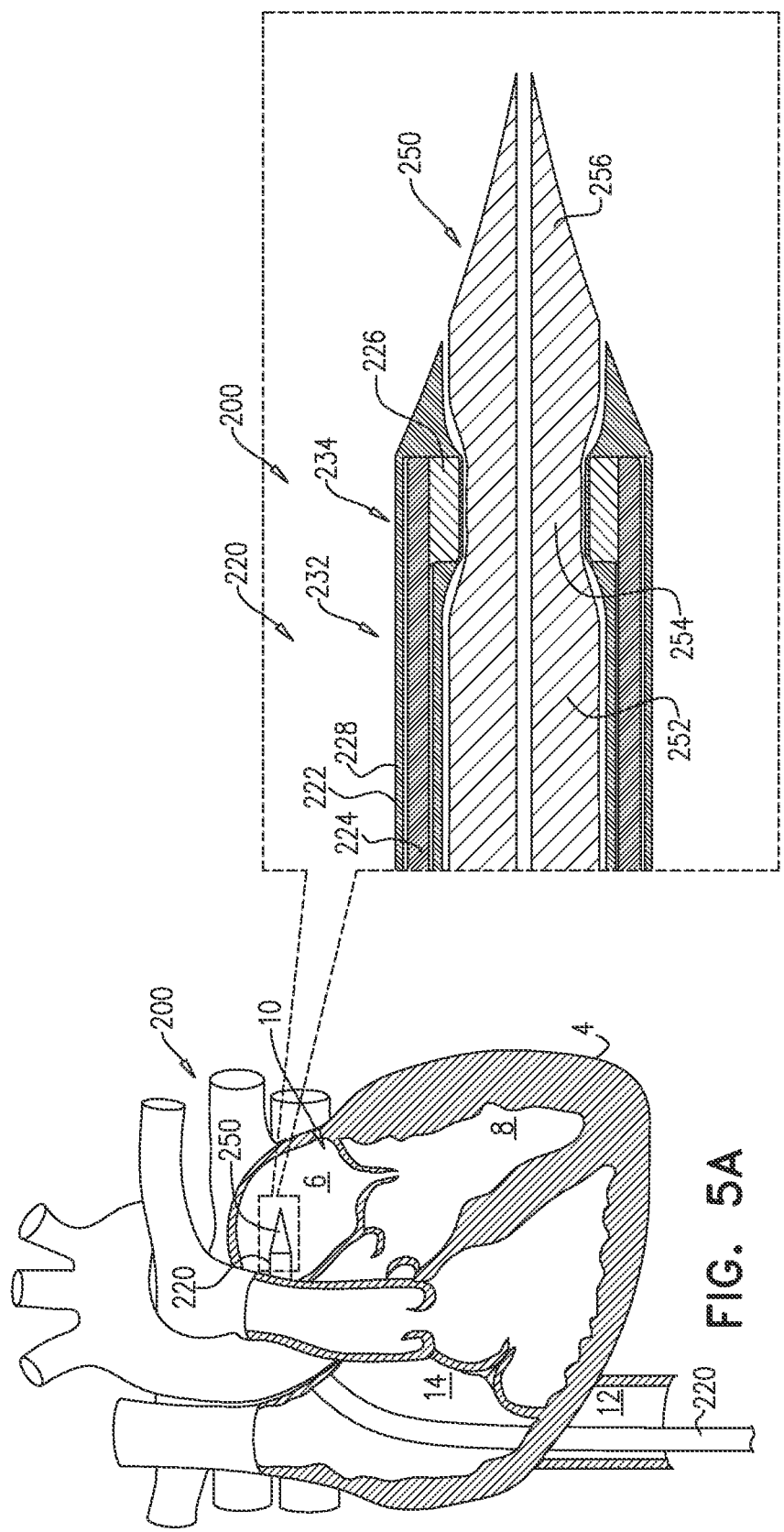

For catheter 220, the noncircular elliptical shape of pull-ring 226 in the first state facilitates a reduced outer diameter d6 of the catheter on minor axis ax3 (i.e., on the steering plane), compared to a similar catheter with a circular pull-ring (FIG. 3A) having outer diameter d7. In this way, outer diameter d6 on minor axis ax3 may be equal to an outer diameter d10 of the catheter on major axis ax4. For some applications, in the first state, although pull-ring 226 is noncircular elliptical in transverse cross-section, the outer surface of tube 222 at axial site 234 is circular in transverse cross-section. Although, in the first state, at axial site 234 an inner diameter d8 on minor axis ax3 is smaller than an inner diameter d9 on major axis ax4, this is not important during advancement of the catheter through the anatomy because lumen 230 is not being used. FIG. 5A shows catheter 220 having been advanced transluminally, via inferior vena cava 12, through right atrium 14 of heart 4, and transseptally into left atrium 6, while in the first state of the catheter. (FIG. 5A also shows a dilator 250, discussed in more detail hereinbelow. FIG. 5C shows the same state of catheter 220, in the absence of the dilator.)

Once distal portion 232 of catheter 220 has reached the target site, one or more articles, such as an inner catheter 240 (typically comprising a second flexible tube), can be advanced through lumen 230, past pull-ring 226. If the article being advanced has an outer diameter that is larger than inner diameter d8 on minor axis ax3, it pushes radially outward on the inner surface of the catheter as it passes the pull-ring, enlarging inner diameter d8, with pull-ring 226 responsively elastically deforming toward its second state (FIG. 3B). Lumen 230 can thereby accommodate an article that has an outer diameter that is greater than inner diameter d8 on minor axis ax3 was in the first state. FIG. 5D shows catheter 220, in its second state, with inner catheter 240 having been advanced through lumen 230, and extending out of the distal end of catheter 220.

There is therefore provided, in accordance with some applications of the invention, a method comprising:
    transluminally advancing a distal portion of a flexible tube
      into a body chamber (such as a heart chamber, e.g., left atrium 6), while an elliptical pull-ring, at the distal portion, is in a first state in which the pull-ring has a first eccentricity; and while the distal portion is disposed in the body chamber, advancing an article through the flexible tube past the pull-ring such that the article elastically deforms the pull-ring into a second state in which the pull-ring has a second eccentricity that is smaller than the first eccentricity.

Often, in the second state, outer diameter d6 on minor axis ax3 is greater than outer diameter d10 on major axis ax4. For example, in the second state, although pull-ring 226 may be circular in transverse cross-section, the outer surface of tube 222 at axial site 234 may be noncircular elliptical in transverse cross-section. Although, in the second state, outer diameter d6 on minor axis ax3 is greater than outer diameter d10 on major axis ax4, this is not important during advancement of catheter 240 through lumen 230 because distal portion 232 of catheter 220 is already disposed at the target site (e.g., within left atrium 6).

Despite the configuration of distal portion 232 (e.g., axial site 234) of catheter 220 described hereinabove, the proximal portion of catheter 220 may be circular in transverse cross-section.

Figure 4:
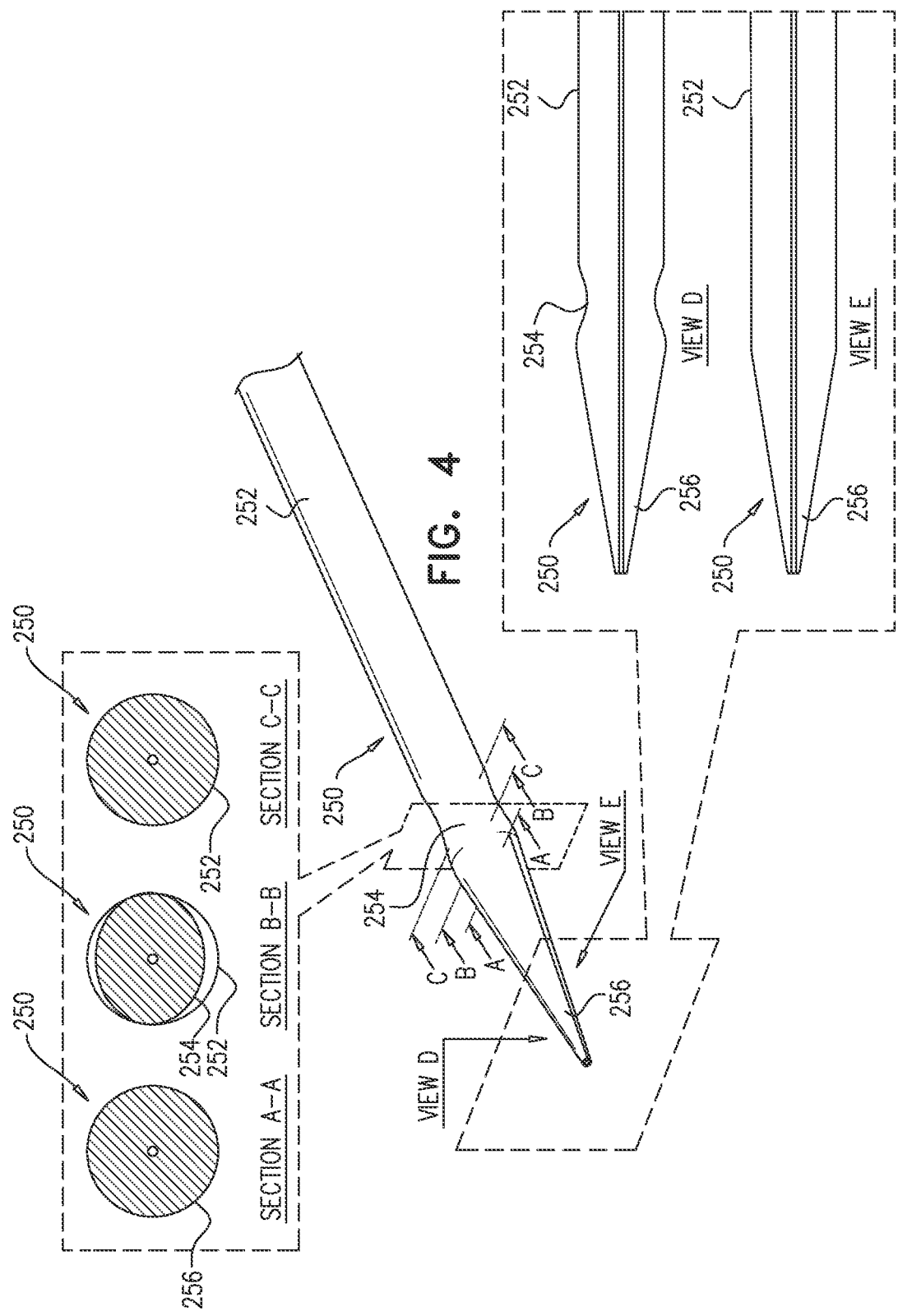

FIG. 4 shows a transseptal dilator 250, which is another component of system 200, in accordance with some applications of the invention. Dilator 250 comprises (or is shaped to define) a shaft 252, a neck 254, and a head 256 connecting the shaft to the head. Head 256 is typically conical. Often, and as shown, in at least one longitudinal cross-section (e.g., view D), neck 254 is narrower than at least a widest portion of head 256. For some such applications, and as shown in that longitudinal cross-section, neck 254 is also narrower than shaft 252. For some applications, and as shown, neck 254 is noncircular in transverse cross-section. For example, neck 254 may be noncircular elliptical in transverse cross-section. Neck 254 may have the shape of a cylinder that has been squeezed from two opposite sides.

Head 256 can be configured to taper away (i.e., distally away) from its widest part and from neck 254.

As shown in FIG. 5A, during transluminal advancement of system 200, (i) neck 254 is disposed at axial site 234, and is therefore disposed within pull-ring 226, and (ii) head 256 extends distally away from the pull-ring and out of the distal opening of catheter 220 (e.g., of tube 222 thereof). In this arrangement, pull-ring 226 is in its first state. Neck 254 can be configured to fit snugly within lumen 230 at axial site 234, e.g., by having a shape that mates with the inner surface of catheter 220, the shape of the inner surface at least partly resulting from the shape of pull-ring 226.

Dilator 250 can be dimensioned such that pull-ring 226 resists axial movement of neck 254 away from the pull-ring, e.g., resisting proximal withdrawal of dilator 250 through lumen 230.

As also shown in FIG. 5A, dilator 250 is used to facilitate transseptal advancement of catheter 220 through the interatrial septum (i.e., from right atrium 14 into left atrium 6). This is performed while pull-ring 226 is in its first state. Besides transseptal advancement, other delivery approaches are also possible.

Figure 5B:
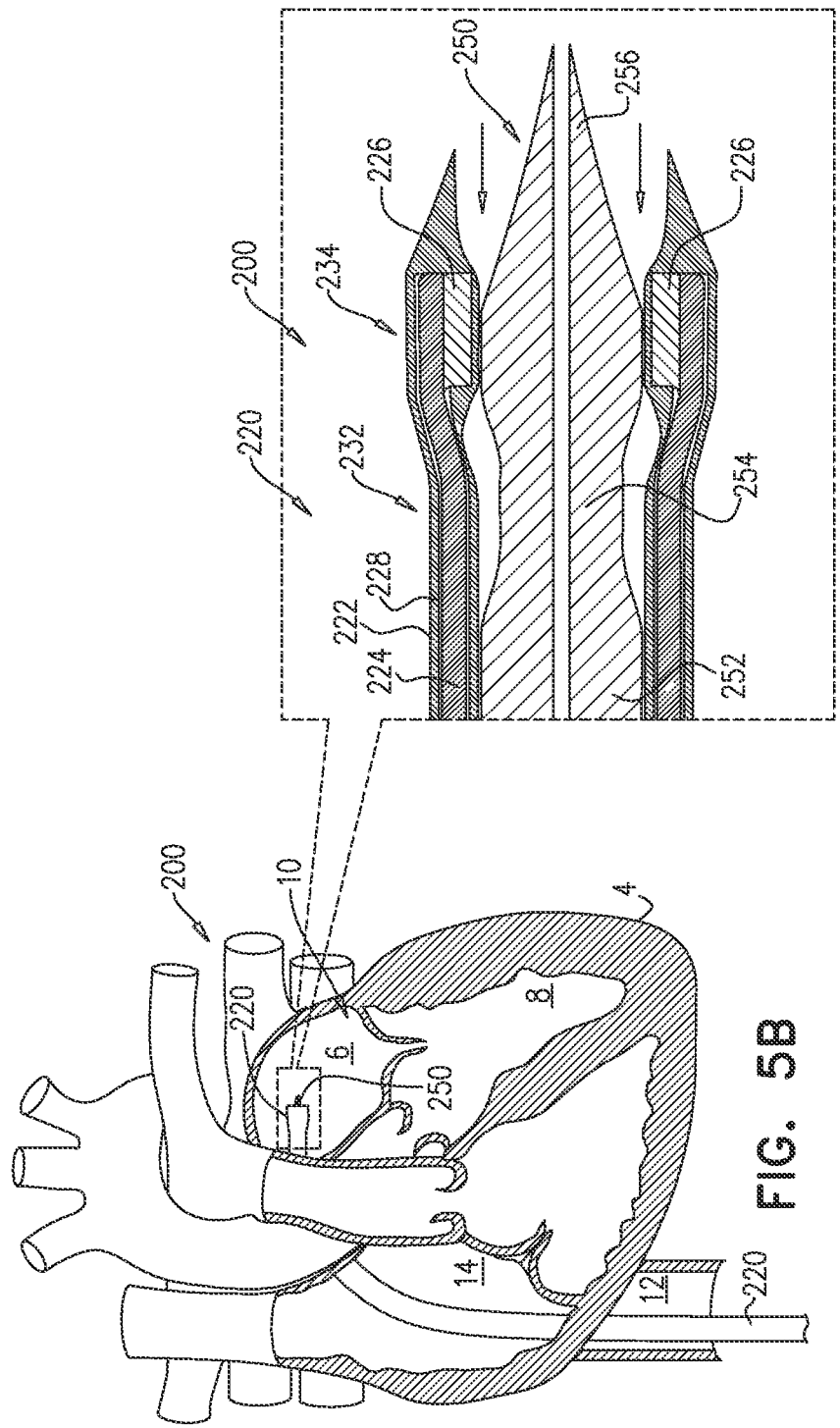
Figure 5C:
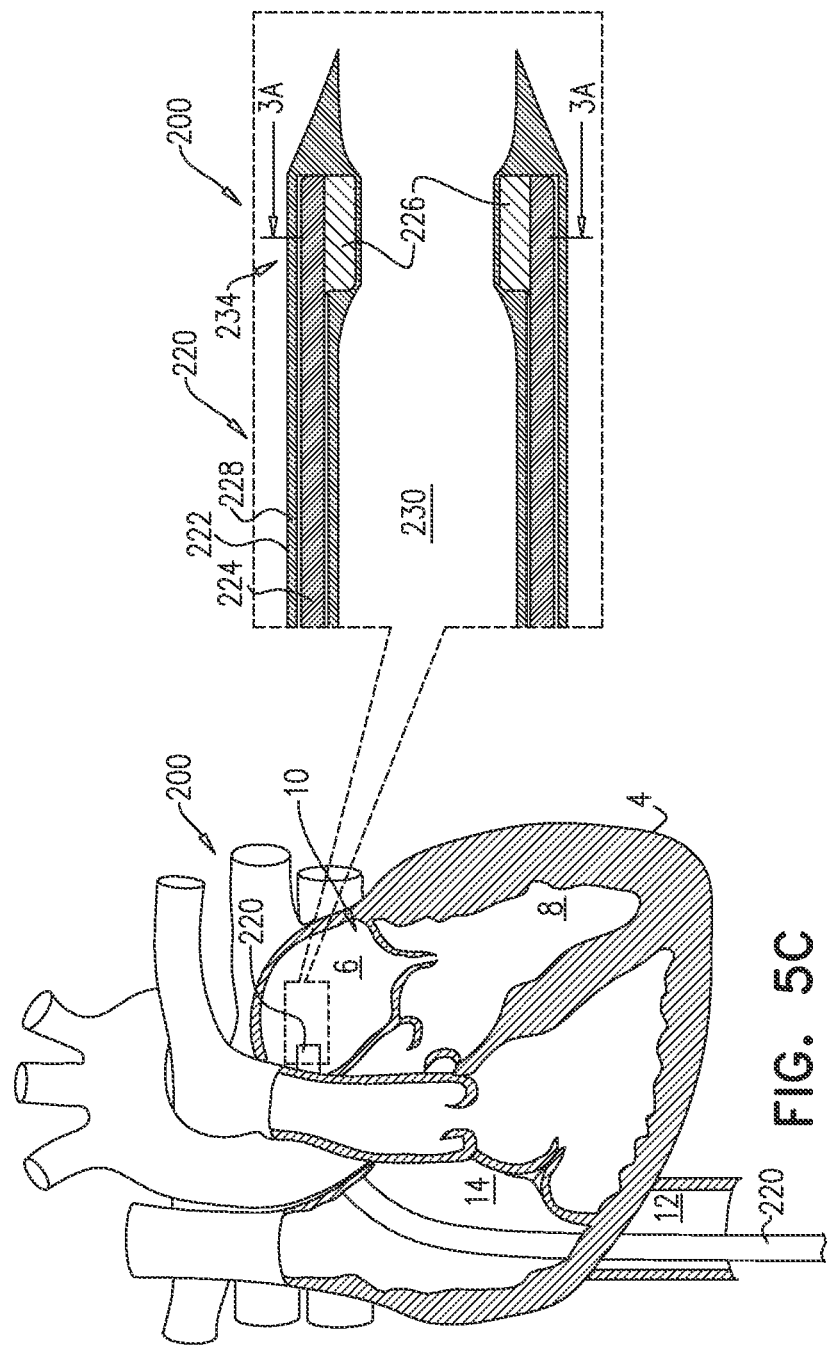
Figure 5D:
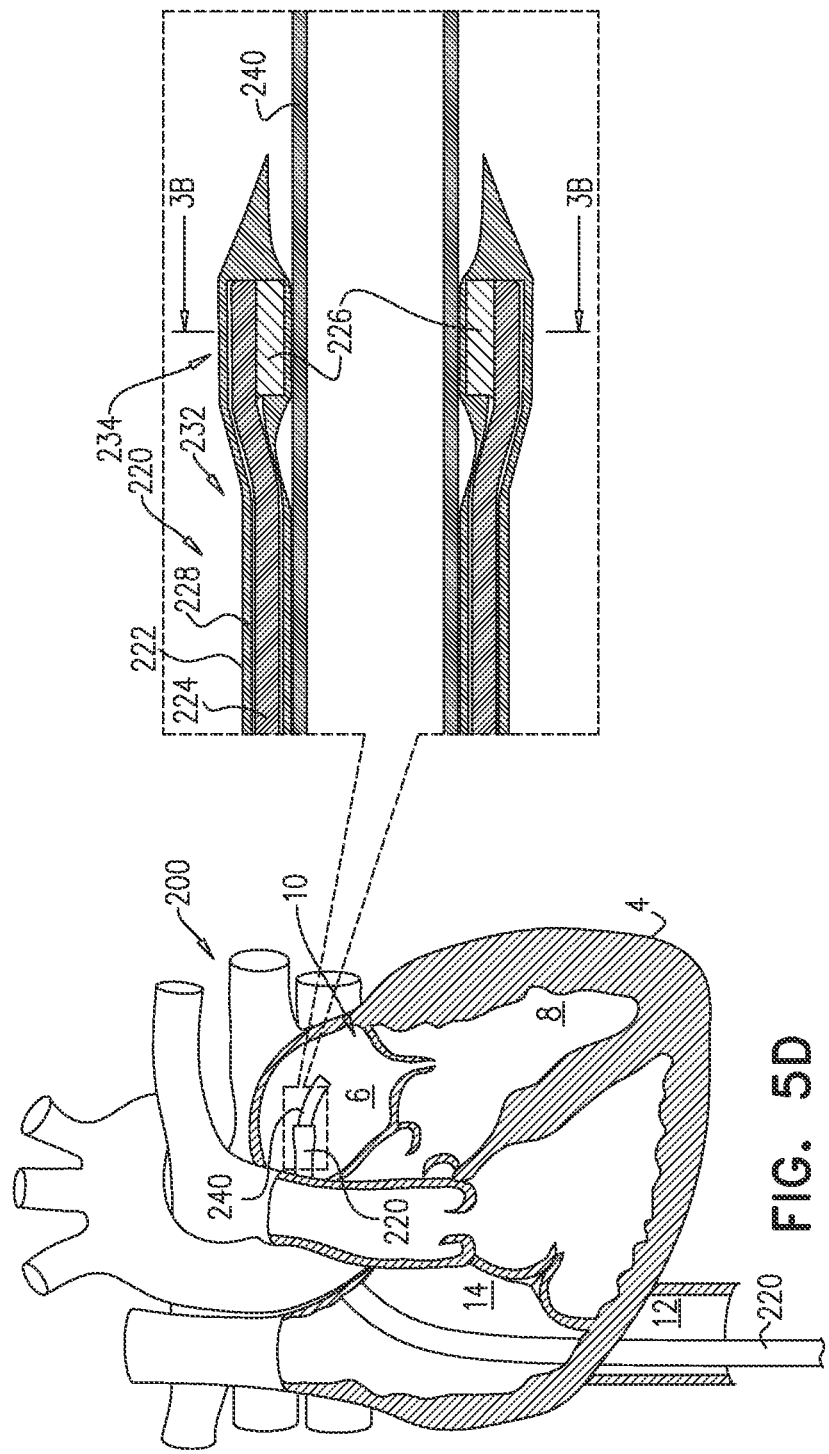

Once distal portion 232 of catheter 220 is within left atrium 6, dilator 250 is withdrawn (FIG. 5B). The resulting axial movement of head 256 through pull-ring 226 elastically deforms the pull-ring toward its second state. Once head 256 has passed pull-ring 226, the pull-ring typically returns automatically toward its first state (FIG. 5C).

Subsequently, a second catheter 240 (and/or another article, such as a tool or an implant) is advanced through lumen 230 of catheter 220 (FIG. 5D). As described hereinabove, pull-ring 226 facilitates this by responsively elastically deforming toward its second state.

Distal portion 232 of catheter 220 may be deflected (i.e., bent) using pull-wires 224, before and/or after catheter 240 has been advanced through lumen 230, in order to guide the procedure.

At the end of the procedure, catheter 240 is withdrawn, allowing pull-ring 226 to return to its first state, and therefore allowing catheter 220 to be transluminally withdrawn while the pull-ring is in its first state.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description. Further, techniques, methods, operations, steps, etc. described or suggested herein can be performed on a living animal or on a non-living simulation, such as on a cadaver, cadaver heart, simulator (e.g. with the body parts, tissue, etc. being simulated), etc.

The invention claimed is:

1. An apparatus comprising:
   a steerable catheter, the steerable catheter comprising:
      a flexible tube:
         having a proximal portion and a distal portion, at least the distal portion being percutaneously advanceable into a subject, and
         comprising a circumferential wall that defines an elongate lumen between the proximal portion and the distal portion;
      a pull-wire, extending, in association with the wall, from the proximal portion to the distal portion; and
      a pull-ring:
         at the distal portion of the tube, coupled to the wall such that the pull-ring circumscribes the lumen,
         coupled to the pull-wire, such that pulling on the pull-wire bends the distal portion of the tube,
         having (i) a first state in which the pull-ring is elliptical and has a first eccentricity, and (ii) a second state in which the pull-ring is elliptical and has a second eccentricity that is smaller than the first eccentricity,
         biased toward assuming the first state, and
         elastically deformable toward the second state; and
   an article axially slidable through the distal portion of the tube such that passage of the article past the pull-ring elastically deforms the pull-ring into the second state.

2. The apparatus according to claim 1, wherein:
   the pull-ring, in at least the first state, defines a major axis and a minor axis, and
   the pull-ring is shaped to define a tension spring at each intersection of the major axis with the pull-ring.

3. The apparatus according to claim 1, wherein:
   the pull-ring is disposed at an axial site at the distal portion of the tube,
   the tube has an outer surface, and
   in the first state, the outer surface of the tube at the axial site is circular in transverse cross-section.

4. The apparatus according to claim 1, wherein:
   the pull-ring is disposed at an axial site at the distal portion of the tube, the tube has an outer surface, and in the second state, the outer surface of the tube at the axial site is non-circular elliptical in transverse cross-section.

5. The apparatus according to claim 1, wherein:

the tube is a first flexible tube, and defines, at the distal portion, a distal opening out of the lumen, and the article is a second flexible tube, advanceable distally through the lumen, past the pull-ring, and out of the distal opening, the second tube dimensioned such that advancement of the second tube through the lumen past the pull-ring elastically deforms the pull-ring toward the second state.

6. The apparatus according to claim 1, wherein:

the pull-wire is a first pull-wire, and the apparatus further comprises a second pull-wire:

extending, in association with the wall, from the proximal portion to the distal portion, axially slidable with respect to the wall at least at the proximal portion, and coupled to the pull-ring opposite the first pull-wire.

7. The apparatus according to claim 1, wherein the tube, at the proximal portion, is circular in transverse cross-section.

8. The apparatus according to claim 1, wherein the pull-ring, in the second state, is circular.

9. The apparatus according to claim 1, wherein:

the pull-ring has (i) an inner surface that faces radially inward toward the lumen, and (ii) an outer surface that faces radially outward from the lumen, and the pull-wire is attached to the outer surface of the pull-ring.

10. The apparatus according to claim 1, wherein:

the tube defines, at the distal portion, a distal opening out of the lumen, the article is a transseptal dilator, shaped to define:

a shaft, extending through the lumen;

a head; and a neck, connecting the shaft to the head, and disposed within the pull-ring, the head extending distally away from the pull-ring and out of the distal opening, and the dilator is dimensioned such that axial movement of the head through the pull-ring elastically deforms the pull-ring toward the second state.

11. The apparatus according to claim 10, wherein the pull-ring is disposed at an axial site at the distal portion of the tube, and the neck fits snugly within the lumen at the axial site.

12. The apparatus according to claim 10, wherein the dilator is dimensioned such that the pull-ring resists axial movement of the neck away from the pull-ring.

13. The apparatus according to claim 10, wherein the neck is noncircular in transverse cross-section.

14. The apparatus according to claim 13, wherein the neck is noncircular elliptical in transverse cross-section.

15. The apparatus according to claim 10, wherein the head is conical.

16. The apparatus according to claim 15, wherein:

the head has a widest part, and tapers away from the widest part and from the neck, and in at least one longitudinal cross-section, a narrowest portion of the neck is narrower than the widest part of the head.

17. The apparatus according to claim 1, wherein:

the pull-ring, in at least the first state, defines a major axis and a minor axis, and the pull-wire is attached to the pull-ring at a circumferential position on the pull-ring that is within 10 degrees of the minor axis.

18. The apparatus according to claim 17, wherein the circumferential position is on the minor axis, and the pull-wire is attached to the pull-ring at the circumferential position that is on the minor axis.

19. A method, comprising:

transluminally advancing a distal portion of a flexible tube into a body chamber of a subject, wherein:

the tube includes a circumferential wall that defines an elongate lumen from a proximal portion of the tube to the distal portion, the distal portion is shaped to define a distal opening out of the lumen, and at the distal portion, an elliptical pull-ring is coupled to the wall such that the pull-ring circumscribes the lumen, the pull-ring being in a first state in which the pull-ring has a first eccentricity; and while the distal portion is disposed in the body chamber, advancing an article through the lumen such that a distal end of the article passes the pull-ring and elastically deforms the pull-ring into a second state in which the pull-ring has a second eccentricity that is smaller than the first eccentricity.

20. The method according to claim 19, wherein:

advancing the distal portion of the flexible tube comprises advancing the distal portion of the flexible tube while the distal portion is circular in transverse cross-section, and advancing the article through the lumen comprises advancing the article through the lumen such that the distal end of the article passes the pull-ring and elastically deforms the distal portion of the flexible tube to become noncircular elliptical in transverse cross-section.

* * * * *